United States Patent
Jim et al.

(10) Patent No.: US 8,699,361 B2
(45) Date of Patent: Apr. 15, 2014

(54) OUT-OF-SYNCHRONIZATION HANDLING METHOD AND APPARATUS

(75) Inventors: Samson Jim, San Diego, CA (US); Sanjay Kenchareddy, San Diego, CA (US); Supratik Bhattacharjee, San Diego, CA (US); Vivek Ramachandran, San Diego, CA (US); Tim T. Liou, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 1147 days.

(21) Appl. No.: 12/242,520

(22) Filed: Sep. 30, 2008

(65) Prior Publication Data

US 2010/0080199 A1     Apr. 1, 2010

(51) Int. Cl.
*H04L 12/26*     (2006.01)

(52) U.S. Cl.
USPC ........... 370/252; 370/328; 370/330; 370/331; 370/329; 370/345; 455/422.1; 455/452.1; 455/452.2

(58) Field of Classification Search
None
See application file for complete search history.

(56) References Cited

U.S. PATENT DOCUMENTS

| | | | |
|---|---|---|---|
| 2002/0097695 A1* | 7/2002 | Herrmann | 370/329 |
| 2008/0019279 A1* | 1/2008 | Kim et al. | 370/241 |
| 2009/0252106 A1* | 10/2009 | Chun et al. | 370/329 |

FOREIGN PATENT DOCUMENTS

| | | |
|---|---|---|
| EP | 1225772 A2 | 7/2002 |
| EP | 1608194 A1 | 12/2005 |
| JP | 2002290413 A | 10/2002 |

OTHER PUBLICATIONS

International Search Report & Written Opinion—PCT/US2009/059089, International Search Authority—European Patent Office—May 26, 2010.
"Universal Mobile Telecommunications System (UMTS); Radio Link Control (RLC), protocol specification (3GPP TS 25.322 version 6.8.0 Release 6); ETSI TS 125 322" ETSI Standards, LIS, Sophia Antipolis Cedex, France, vol. 3-R2, No. V6.8.0. Jun. 1, 2006, XP014034287 ISSN: 0000-0001 cited in the application p. 14, lines 1,2; figure 4.3a p. 26, lines 4-8; figure 9.2 p. 47, lines 22-32 p. 59, line 24—p. 60, line 34.
Taiwan Search Report—TW098133275—TIPO—Jan. 3, 2013.

* cited by examiner

*Primary Examiner* — Kibrom T Hailu
*Assistant Examiner* — Zewdu A Beyen
(74) *Attorney, Agent, or Firm* — Eric Ho

(57) ABSTRACT

A method for handling out-of-synchronization (SYNC) includes generating a plurality of combination sets of transport channels utilized by a communication device. The method also includes selecting, based on a window-based parameter, a highest-ranking combination set of transport channels out of the plurality of combination sets of transport channels. The highest-ranking combination set of transport channels excludes one or more out-of-SYNC transport channels. The method further comprises providing, to a window-based data processing unit, data packets from transport channels in the highest-ranking combination set of transport channels, without providing data packets from the one or more out-of-SYNC transport channels to the window-based data processing unit. Apparatus and machine-readable media for out-of-SYNC avoidance and/or detection are also provided.

50 Claims, 15 Drawing Sheets

Deliver {7,8,9,10} to an upper layer

Deliver {11,12} to upper layer

{13,14} will be discarded in the future because
VR(UDR)=VR(UDH)-DAR_Window_Size + 1>14

OUT-OF-SYNCHRONIZATION HANDLING METHOD AND APPARATUS

BACKGROUND

A data network can transmit identical streams of data packets through multiple data links to a terminal. Different data links, however, experience different data packet errors. Due to the best effort type network and varying latency between the core network and base stations, the data links can have varying delays to each other larger than the size of a window utilized by a processing unit of a terminal. They can be categorized as an out-of-synchronization (SYNC) data link. When the data links are out of SYNC, the data processing capability at the terminal is degraded, and various problems such as the following may be introduced. The error rate seen by an upper layer of a signaling protocol stack is increased. A window at the terminal cannot maintain all the out-of-sequence data packets. The data packets from the data links that are running behind will be discarded. A continuous and ordered data stream cannot be formed and delivered to the upper layer of the signaling protocol stack.

One approach to handling some of these problems relies solely on a network. The network, however, needs to maintain the latency among all data links, which are carrying the data stream. Since the network such as the packet switch network is a best effort network, it does not guarantee a tight upper bound of the latency. The variation of the delay depends highly on the current traffic loading in base stations. When the data links are out of SYNC due to the large latency between data links, an attempt to selectively combine data links would adversely degrade the data processing performance. An in-sequence stream of data packet would become difficult to form. A network may have a mechanism to tighten the latency upper bound by incorporating a quality of service (QoS) architecture. However, this approach would involve modification in many entities in the core network. It would also be tremendously complicated to maintain.

SUMMARY

In one aspect of the disclosure, a communication device comprises a generation module, a ranking module, and a delivery module. The generation module is configured to generate a plurality of combination sets of transport channels utilized by the communication device. The ranking module is configured to select, based on a window-based parameter, a highest-ranking combination set of transport channels out of the plurality of combination sets of transport channels. The highest-ranking combination set of transport channels excludes one or more out-of-SYNC transport channels. The delivery module is configured to provide, to a window-based data processing unit, data packets from transport channels in the highest-ranking combination set of transport channels, without providing data packets from the one or more out-of-SYNC transport channels to the window-based data processing unit.

In a further aspect of the disclosure, a method for handling out-of-SYNC comprises: generating a plurality of combination sets of transport channels utilized by a communication device; and selecting, based on a window-based parameter, a highest-ranking combination set of transport channels out of the plurality of combination sets of transport channels. The highest-ranking combination set of transport channels excludes one or more out-of-SYNC transport channels. The method further comprises providing, to a window-based data processing unit, data packets from transport channels in the highest-ranking combination set of transport channels, without providing data packets from the one or more out-of-SYNC transport channels to the window-based data processing unit.

In yet a further aspect of the disclosure, a communication device comprises: means for generating a plurality of combination sets of transport channels utilized by the communication device; and means for selecting, based on a window-based parameter, a highest-ranking combination set of transport channels out of the plurality of combination sets of transport channels. The highest-ranking combination set of transport channels excludes one or more out-of-SYNC transport channels. The communication device further comprises means for providing, to a window-based data processing unit, data packets from transport channels in the highest-ranking combination set of transport channels, without providing data packets from the one or more out-of-SYNC transport channels to the window-based data processing unit.

In yet a further aspect of the disclosure, a machine-readable medium comprises instructions executable by a processing system in a communication device. The instructions comprise code for generating a plurality of combination sets of transport channels utilized by the communication device and code for selecting, based on a window-based parameter, a highest-ranking combination set of transport channels out of the plurality of combination sets of transport channels. The highest-ranking combination set of transport channels excludes one or more out-of-SYNC transport channels. The instructions further comprise code for providing, to a window-based data processing unit, data packets from transport channels in the highest-ranking combination set of transport channels, without providing data packets from the one or more out-of-SYNC transport channels to the window-based data processing unit.

In yet a further aspect of the disclosure, a communication device comprises a sequence ranking module, a sequence range module, and a delivery module. The sequence ranking module is configured to determine the highest sequence number of data packets received from all transport channels utilized by the communication device. The sequence range module is configured to determine a range of sequence numbers based on the highest sequence number and a window size of a window-based data processing unit. The delivery module is configured to provide, to the window-based data processing unit without providing data packets that are outside the range of sequence numbers, data packets that are within the range of sequence numbers and that are available to the delivery module.

In yet a further aspect of the disclosure, a method for out-of-SYNC avoidance comprises: determining the highest sequence number of data packets received from all transport channels utilized by a communication device; and determining a range of sequence numbers based on the highest sequence number and a window size of a window-based data processing unit. The method further comprises providing, to the window-based data processing unit without providing data packets that are outside the range of sequence numbers, data packets that are within the range of sequence numbers and that are available to the delivery module.

In yet a further aspect of the disclosure, a communication device comprises: means for determining the highest sequence number of data packets received from all transport channels utilized by a communication device; and means for determining a range of sequence numbers based on the highest sequence number and a window size of a window-based data processing unit. The communication device further comprises means for providing, to the window-based data processing unit without providing data packets that are outside the range of sequence numbers, data packets that are within the range of sequence numbers and that are available to the delivery module.

In yet a further aspect of the disclosure, a machine-readable medium comprises instructions executable by a processing system in a communication device. The instructions comprise code for determining the highest sequence number of data packets received from all transport channels utilized by a communication device and code for determining a range of sequence numbers based on the highest sequence number and a window size of a window-based data processing unit. The instructions further comprise code for providing, to the window-based data processing unit without providing data packets that are outside the range of sequence numbers, data packets that are within the range of sequence numbers and that are available to the delivery module.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The term "transport channel" may refer to a communication route or a data link for data transport between peer physical layer entities. Transport channels may relate to the manner in which information is transmitted. Generally, there can be two types of transport channels known as Common Transport Channels and Dedicated Transport Channels. A transport channel can be defined by how and with what characteristics data can be transferred over the air interface on the physical layer, for example, whether using dedicated or common physical channels, or multiplexing of logical channels. Transport channels may serve as service access points (SAPs) for the physical layer. In a Universal Mobile Telecommunications System (UMTS) system, a transport channel may describe how the logical channels can be transferred and map these information flows to physical channels. Transport channels can be used to carry signaling and user data between a Medium Access Control (MAC) layer and a Physical Layer (L1) (see FIG. 2). A Radio Network Controller (RNC) can see transport channels. Information may pass to the physical layer from the MAC layer over any one of a number of transport channels that can be mapped to physical channels. Transport channels may include other types of channels.

The term "cell" may refer to either hardware or a geographic coverage area depending on the context in which the term is used.

The term "radio bearer" may refer to a service provided by Layer 2 (see FIG. 2) for transfer of user data between User Equipment (UE) and the UMTS Terrestrial Radio Access Network (UTRAN).

Figure 1:
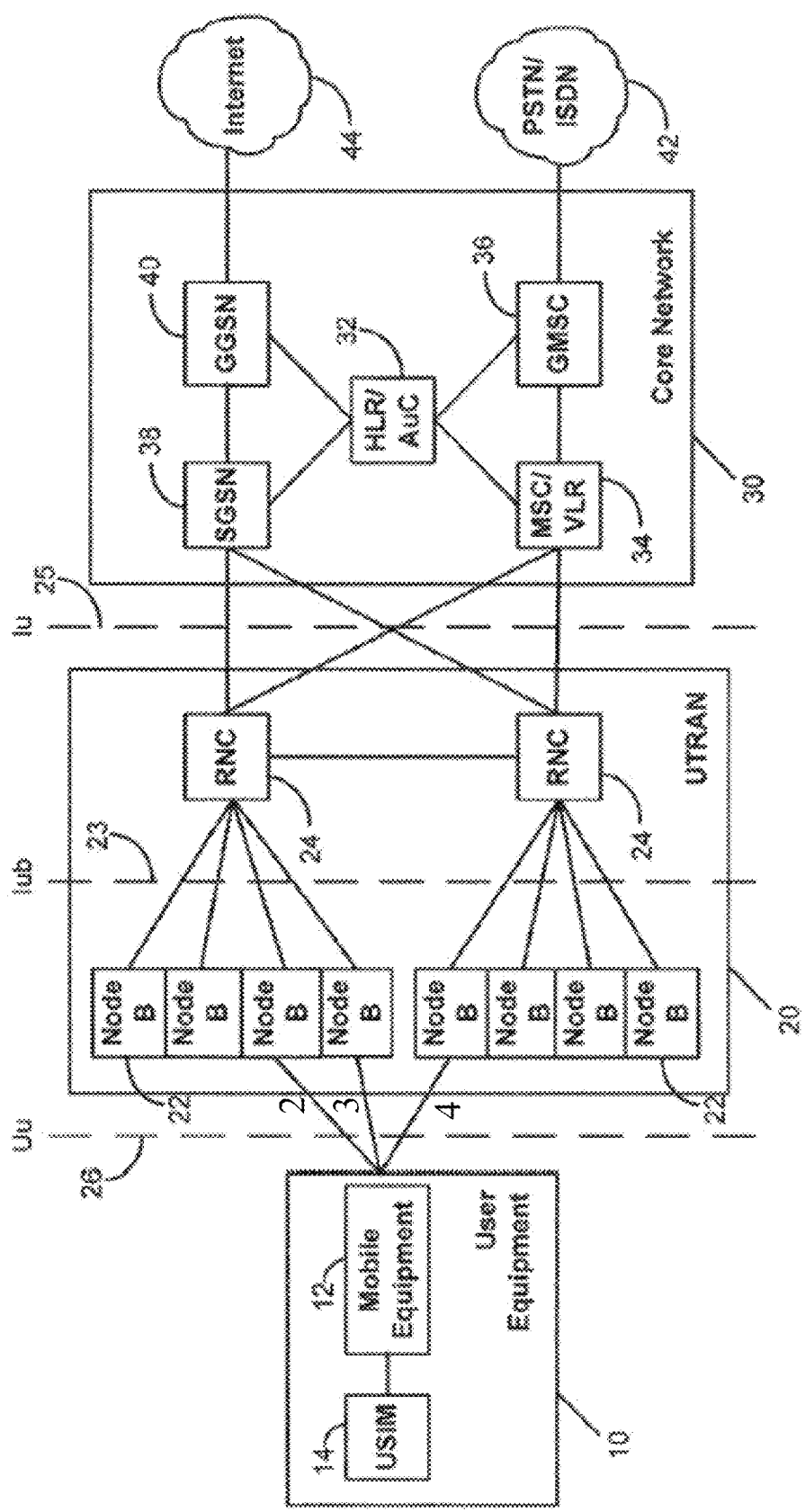
FIG. 1 is a block diagram illustrating an example of a communication system according to a Universal Mobile Telecommunications System (UMTS) network topology.

FIG. 1 is a block diagram illustrating an example of a communication system according to a Universal Mobile Telecommunications System (UMTS) network topology. A UMTS system may include a User Equipment (UE) 10, an access network 20, and a core network 30. The UE 10 is coupled to the access network 20, which is coupled to the core network 30. The core network 30 can be coupled to an external network.

A UE 10 may include mobile equipment 12 and a Universal Subscriber Identity Module (USIM) 14 that contains a user's subscription information. A Cu interface (not shown) is the electrical interface between the USIM 14 and the mobile equipment 12. A UE 10 is generally a device that allows a user to access UMTS network services. A UE 10 may be a mobile device or a mobile station such as a cellular telephone, a fixed station, or other data terminal. A UE 10 may be, for an example, a radio terminal used for radio communications over an air interface (Uu) 26. A UE 10 can be a computer, a laptop computer, a telephone, a mobile telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)). A UE 10 can be stationary or mobile, and it can be a digital device.

A Uu interface 26 is an interface through which a UE 10 may access the fixed part of the system. The USIM 14 is generally an application that resides on a "smartcard" or other logic card that includes a microprocessor. A smart card may hold the subscriber identity, perform authentication algorithms, and store authentication in encryption keys and subscription information needed at the terminal.

The access network 20 may include the radio equipment for accessing the network. In a WCDMA system, the access network 20 is the Universal Terrestrial Radio Access Network (UTRAN). The UTRAN may include at least one Radio Network Subsystem (RNS) that includes at least one base station or "Node B" 22 coupled to at least one Radio Network Controller (RNC) 24.

The RNCs 24 control the radio resources of the UTRAN. The RNCs 24 of the access network 20 may communicate with the core network 30 via an Iu interface 25. The Uu interface 26, Iu interface 25, Iub interface 23, and Iur interface (not shown) allow for internetworking between equipment from different vendors and are specified in the 3GPP standards. Implementation of the Radio Network Controller (RNC) varies from vendor to vendor, and therefore will be described in general terms below.

The Radio Network Controller (RNC) 24 can serve as the switching and controlling element of the UMTS Terrestrial Radio Access Network (UTRAN), and is located between the Iub interface 23 and the Iu interface 25. The RNC 24 can act as a service access point for all services the UTRAN provides to the core network 30, for example, management of connections to the user equipment. The Iub interface 23 connects a Node B 22 and a Radio Network Controller (RNC) 24. The Iu interface 25 can connect the UTRAN 20 to the core network 30. An RNC 24 can provide a switching point between the Iu bearer and the base stations.

A UE 10 may have several radio bearers between itself and the RNC 24. The radio bearer is related to the UE context, which is a set of definitions required by the Iub in order to enrage common connections and dedicated connections between the UE and RNC. The respective RNCs 24 may communicate with each other over an optional Iur interface that allows soft handover between cells connected to different nodes 22. The Iur interface thus allows for inter-RNC connections. In such cases, a serving RNC 24 maintains the Iu connection 25 to the core network 30 and performs selector and outer loop power control functions, while a drift RNC transfers frames that can be exchanged over the Iur interface to mobile station 10 via one or more base stations 22.

The RNC that controls one Node B 22 can be referred to as the controlling RNC of the Node B, and controls the load and congestion of its own cells, and also executes admission control and code allocations for new radio links to be established in those cells.

RNCs 24 and base stations (or Node Bs 22) can be connected via and communicate over the Iub interface 23. The RNCs 24 can control use of the radio resources by each base station 22 coupled to a particular RNC 24. Each base station 22 controls one or more cells and provides a radio link to a UE 10. A base station 22 may perform interface processing such as channel coding and interleaving, rate adaptation and spreading. The base station 22 may also perform basic radio resource management operations such as the interloop power control. The base station 22 may convert the data flow between the Iub and Uu interfaces 23, 26. The base station 22 may also participate in radio resources management. An over-the air interface Uu 26 couples each base station 22 to a UE 10. The base stations 22 can be responsible for radio transmission in one or more cells to a UE 10, and for radio reception in one or more cells from a UE 10. In this example, a UE 10 is shown with three transport channels 2, 3, and 4, each of which is from a different Node B. Transport channels utilized by a UE may be from one or more Node B's.

The core network 30 may include all of the switching and routing capability for (1) connecting to either the Public Switched Telephone Network (PSTN) 42 if a circuit switched call is present, or to an Integrated Services Digital Network (ISDN) or a Packet Data Network if a packet-switched call is present, (2) mobility and subscriber location management, and (3) authentication services. The core network 30 can include a home location register (HLR) 32, a mobile switching services center/visitor location register (MSC/VLR) 34, a gateway mobile switching center (GMSC) 36, a serving general packet radio service support node (SGSN) 38, and a gateway GPRS support node (GGSN) 40.

The core network 30 may be coupled to an external circuit-switched (CS) network 42 that provides circuit-switched connections, such as PSTN, or ISDN if a packet switched call is present, or may be coupled to a PS network 44, such as the Internet, that provides connections for packet data services if a packet switched call is present.

Figure 2:
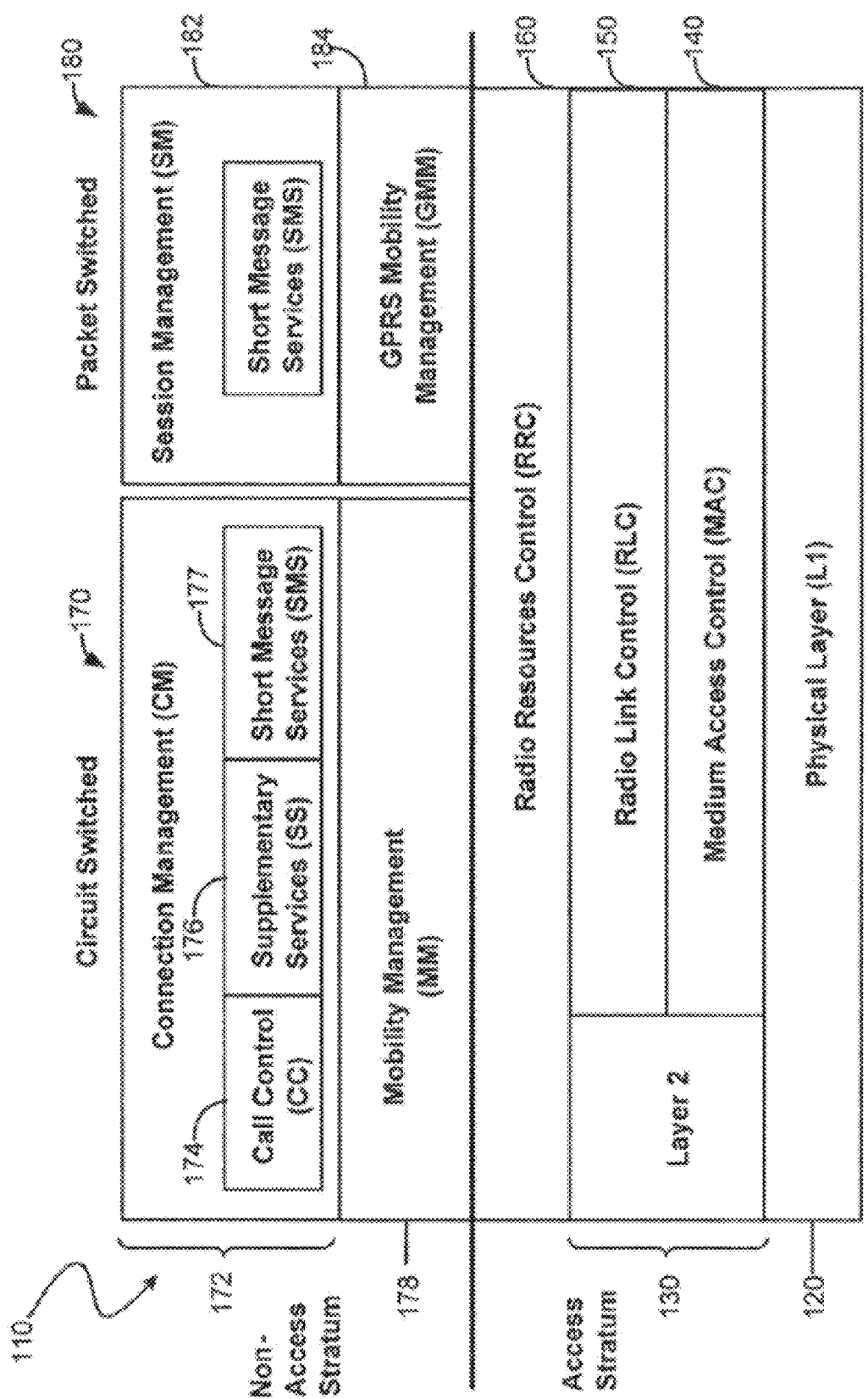
FIG. 2 is a block diagram illustrating an example of an UMTS signaling protocol stack.

FIG. 2 is a block diagram illustrating an example of an UMTS signaling protocol stack 110. The UMTS signaling protocol stack 110 may include an access stratum and a non-access stratum (NAS). The access stratum typically includes a physical layer 120, layer 2 130 which includes a medium access control (MAC) layer 140 and a radio link control (RLC) layer 150, and a radio resources control (RRC) layer 160.

The UMTS non-access stratum layer is essentially the same as GSM upper layers and can be divided into a circuit switched portion 170 and a packet switched portion 180. The circuit switched portion 170 may include a connection management (CM) layer 172 and a mobility management (MM) layer 178. The CM layer 172 handles circuit-switched calls and includes various sublayers.

The call control (CC) sublayer 174 executes functions such as establish and release. The supplementary services (SS) sublayer 176 executes functions such as call forwarding and three-way calling. A short message-services (SMS) sublayer 177 executes short message services. The MM layer 178 handles location updating and authentication for circuit-switched calls. The packet switched portion 180 includes a session management (SM) sublayer 182 and a GPRS mobility management (GMM) sublayer 184. The session management (SM) sublayer 182 handles packet-switched calls by executing functions such as establish and release, and also includes a short message services (SMS) section. The GMM sublayer 184 handles location updating and authentication for packet-switched calls.

Figure 3:
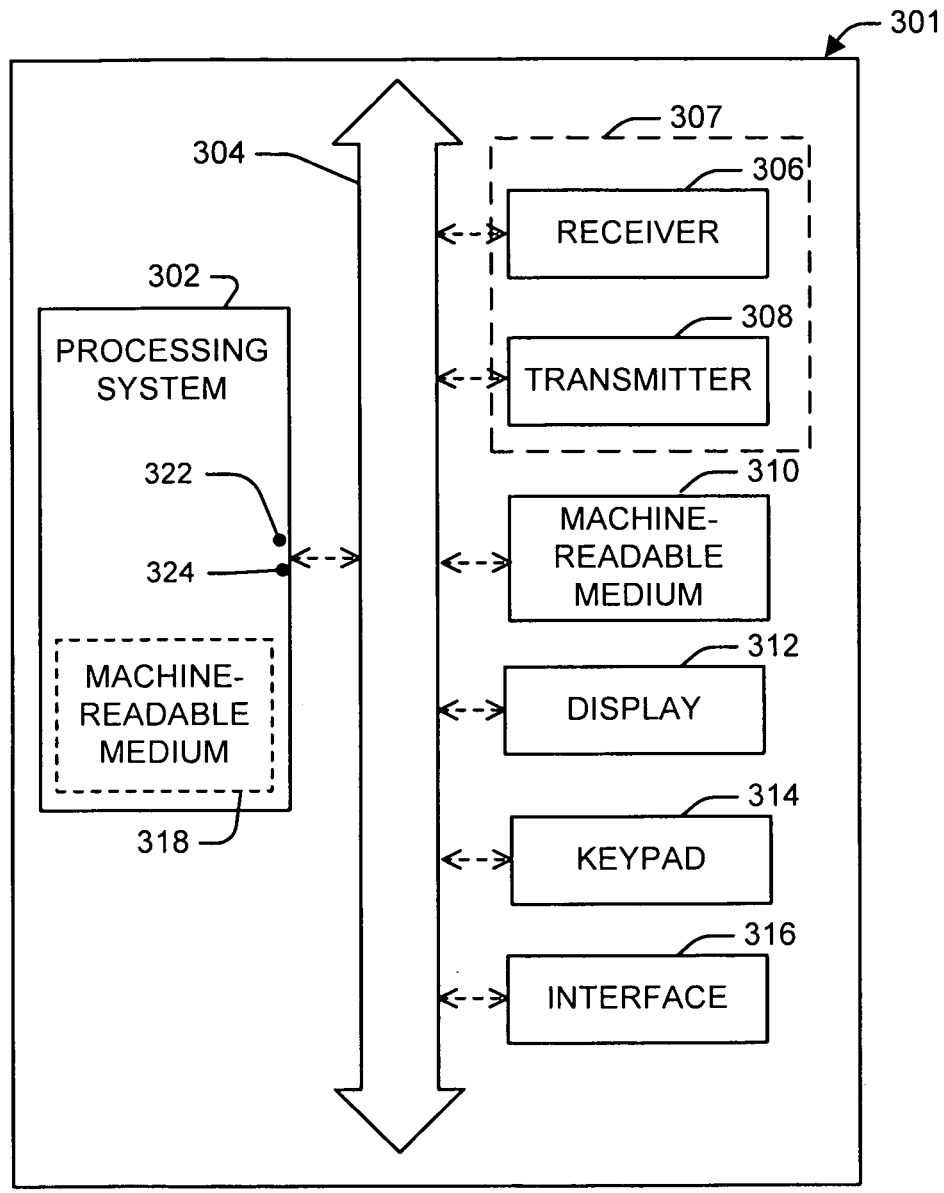
FIG. 3 is a conceptual block diagram illustrating an example of a communication system.

FIG. 3 is a conceptual block diagram illustrating an example of a communication system. A communication system 301 may be a UE 10, a Node B 22, an RNC 24, or another type of device. The communication system 301 includes a processing system 302. The processing system 302 is capable of communication with a receiver 306 and a transmitter 308 through a bus 304 or other structures or devices. It should be understood that communication means other than busses could be utilized with the disclosed configurations. The processing system 302 can generate audio, video, multimedia, and/or other types of data to be provided to the transmitter 308 for communication. In addition, audio, video, multimedia, and/or other types of data can be received at the receiver 306, and processed by the processing system 302.

The processing system 302 may include a general-purpose processor or a specific-purpose processor for executing instructions and may further include a machine-readable medium 318, such as a volatile or non-volatile memory, for storing data and/or instructions for software programs. The instructions, which may be stored in a machine-readable medium 310 and/or 318, may be executed by the processing system 302 to control and manage access to the various networks, as well as provide other communication and processing functions. The instructions may also include instructions executed by the processing system 302 for various user interface devices, such as a display 312 and a keypad 314. The processing system 302 may include an input port 322 and an output port 324. Each of the input port 322 and the output port 324 may include one or more ports. The input port 322 and the output port 324 may be the same port (e.g., a bi-directional port) or may be different ports.

The processing system 302 may be implemented using software, hardware, or a combination of both. By way of example, the processing system 302 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 318) may include storage integrated into a processor, such as might be the case with an ASIC. Machine-readable media (e.g., 310) may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 302. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a UE 10, a Node B 22, or an RNC 24 or by a processing system of a UE 10, a Node B 22, or an RNC 24. Instructions can be, for example, a computer program including code.

An interface 316 may be any type of interface and may reside between any of the components shown in FIG. 3. An interface 316 may also be, for example, an interface to the outside world (e.g., an Internet network interface). A transceiver block 307 may represent one or more transceivers, and each transceiver may include a receiver 306 and a transmitter 308. A functionality implemented in a processing system 302 may be implemented in a portion of a receiver 306, a portion of a transmitter 308, a portion of a machine-readable medium 310, a portion of a display 312, a portion of a keypad 314, or a portion of an interface 316, and vice versa.

Some of the acronyms referenced in this disclosure are described in Table 1 below.

TABLE 1

| Acronym | Description |
| --- | --- |
| BLER | Block error |
| DAR | Duplicate avoidance and reordering |
| MBMS | Multimedia Broadcast Multicast Service |
| MTCH | MBMS traffic channel |
| out-of-SYNC (or out-of-sync or out-of-Sync) | Out-of-synchronization |
| PDU | Protocol data unit |
| p-t-m | Point to multi-point |
| RLC | Radio link control |
| RNC | Radio network controller |
| RRC | Radio resources control |
| SAP | Service access point |
| SDU | Service data unit |
| SN | Sequence number |
| SYNC (or Sync or sync) | Synchronized or synchronization |
| TCH | Transport channel |
| Timer_DAR | Timer of DAR |
| TTI | Transmission time interval |
| UM | Unacknowledged mode |
| UMD | Unacknowledged mode data |
| UMTS | Universal Mobile Telecommunications System |
| UTRAN | UMTS terrestrial radio access network |

Some of the state variables referenced in this disclosure are described in Table 2 below.

TABLE 2

| State Variables | Description |
| --- | --- |
| VR(UDR) | The sequence number of the next UMD PDU that is expected to be received |
| VR(UDH) | The sequence number of the highest numbered UMD PDU that has been received |
| VR(UDT) | The sequence number of the UMD PDU associated with the Timer_DAR |

This disclosure provides methods and apparatus for avoiding and detecting out-of-SYNC transport channels. For example, the disclosure provides methods and apparatus for (i) optimizing RLC duplicate avoidance and reordering (DAR) and (ii) detecting out-of-SYNC MTCHs for the MBMS p-t-m mode, according to certain aspects of the subject technology. RLC DAR is a WCDMA Rel6 feature for selectively combining multiple MTCHs.

A MTCH is an example of a transport channel (TCH). MTCHs are utilized for a Multimedia Broadcast Multicast Service (MTMS). While this disclosure refers to MTCHs in many of the examples provided herein, the term "MTCH"

may be substituted with "TCH" or "channel," and the subject technology is not limited to MTCHs or any particular type of transport channels.

The functional procedure of duplicate avoidance and reordering (DAR) for unacknowledged mode can be found in 9.7.10 of 3GPP TS 25.322 v6.8.0. It combines protocol data units (PDUs) from multiple sources to form a single ordered PDU sequence to the reassembly function. However, the procedure assumes that the MTCHs are synchronized (SYNC) within a configured DAR window size (DAR_Window_Size).

FIGS. 4A-4D illustrate an example of a transport channel (TCH) out-of-SYNC problem. In this case, PDUs 13 and 14 are missing although TCH1 or TCH2 may deliver them in a later transmission time interval (TTI). However, since the TCH3 is quite ahead of TCH1 and TCH2, in the case, the DAR unit fails to optimally combine the multiple TCHs into a continuous and ordered stream of PDUs to provide them to an upper layer (e.g., an RRC 160 in FIG. 2).

Figure 4A:
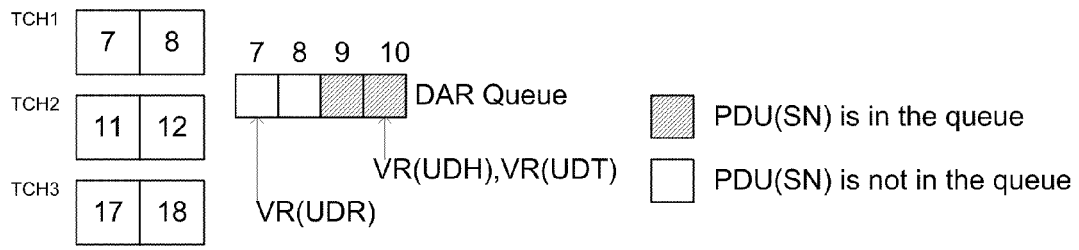
FIGS. 4A-4D illustrate an example of a transport channel (TCH) out-of-SYNC problem.

FIG. 4A shows an example of the contents of three transport channels TCH1, TCH2, and TCH3. TCH1 contains PDUs 7 and 8. TCH2 contains PDUs 11 and 12. TCH3 contains PDUs 17 and 18. In this instance, VR(UDR)=7, VR(UDH)=10, and VR(UDT)=10. The window size of the DAR unit (DAR Window Size) is 4. The timer of the DAR unit is any value longer than the transmission time interval (TTI). It shows PUDs that in the queue (($\boxtimes$)) as well as PUDs that are not in the queue ($\square$).

Figure 4B:
Figure 4C:
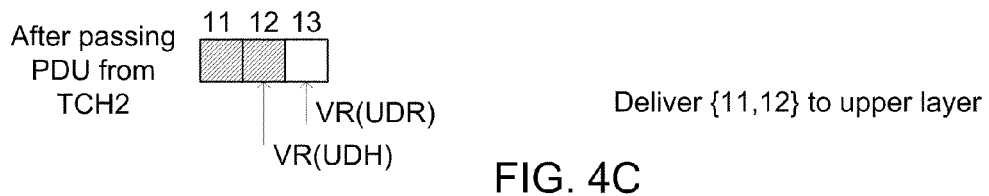
Figure 4D:
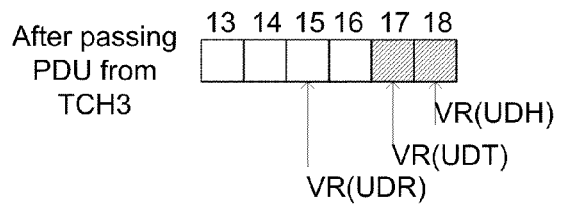

FIG. 4B shows that after delivering PDUs 7, 8, 9 and 10 to an upper layer, VR(UDH)=10, and VR(UDR)=11. FIG. 4C shows that after delivering PDUs 11 and 12 to the upper layer, VR(UDH)=11, and VR(UDR)=13. FIG. 4D shows that after delivering PDUs 17 and 18 to the upper layer, VR(UDR)=15, VR(UDH)=18, and VR(UDT)=17. PDUs 13 and 14 will be discarded in the future because VR(UDR), which is VR(UDH)-DAR_Window_Size, is greater than 14, which is the highest missing sequence number (SN).

Figure 5:
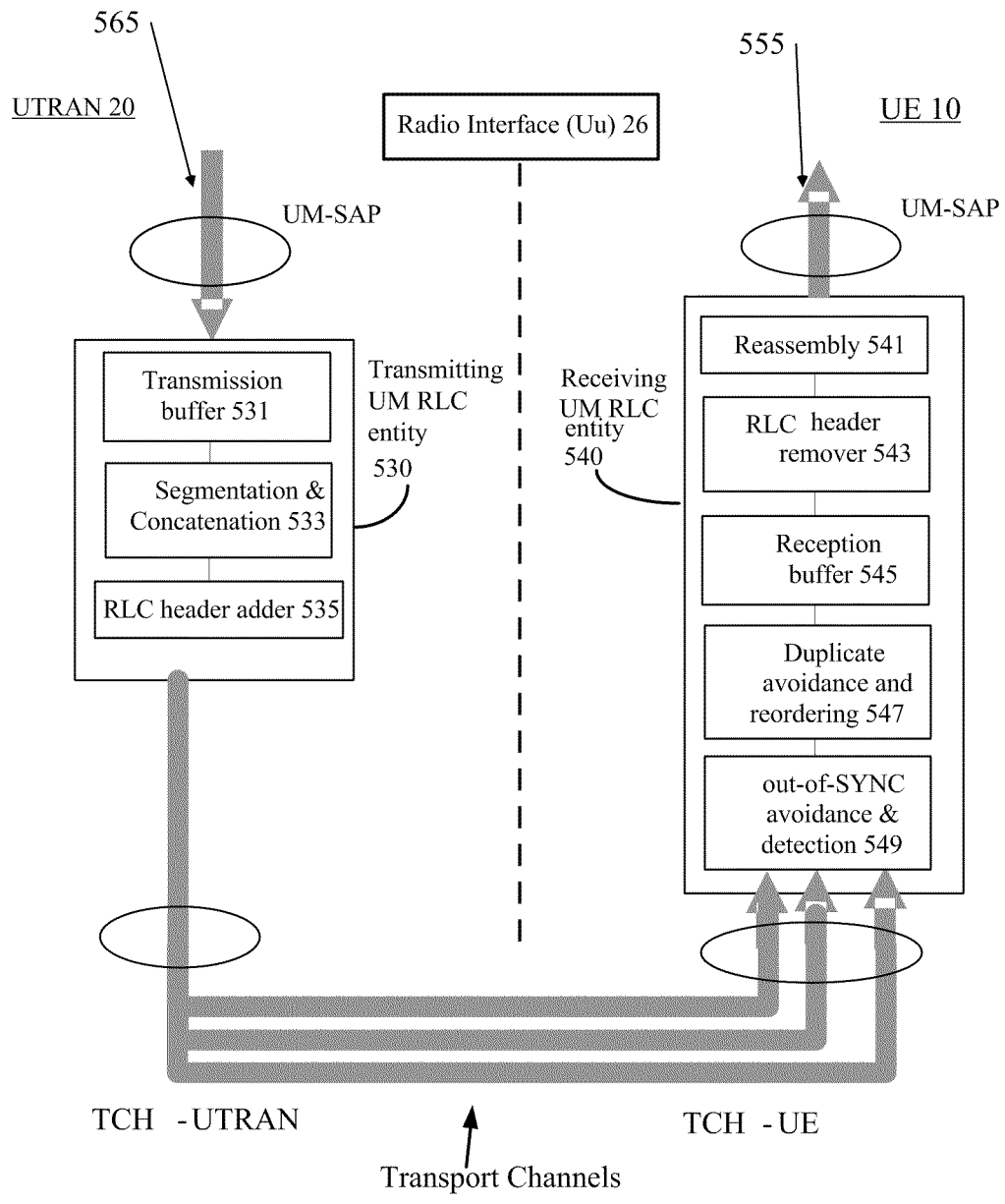
FIG. 5 is a diagram illustrating an example of a communication system.

FIG. 5 is a diagram illustrating an example of a communication system. A communication system 500 may include an access network UTRAN 20, a UE 10, and a radio interface Uu 26. A UTRAN 20 may include a transmitting UM RLC entity 530 (e.g., an RNC). A transmitting UM RLC entity 530 may include a transmission buffer 531 for receiving SDUs from higher layers through a radio bearer 565, a segmentation & concatenation unit 533 for splitting the SDUs into various rows and producing PDUs, and an RLC header adder 535 for adding RLC headers to the encoded PDUs.

A UE 10 may include a receiving UM RLC entity 540, which may represent, for example, an RLC layer of a cell phone. The receiving UM RLC entity 540 may include an out-of-SYNC avoidance & detection unit 549, a duplicate avoidance and reordering (DAR) unit 547, a reception buffer 545, an RLC header remover unit 543, and a reassembly unit 541.

The out-of-SYNC avoidance & detection unit 549 can filter out the PDUs from a certain transport channel(s), which is detected to be out-of-SYNC relative to other transport channels for a short time period (e.g., less than a predetermined time period). In other words, the unit 549 may filter out the PDUs from out-of-SYNC transport channel(s). In addition, it can call back a controller (e.g., an RRC) for a "type-1" out-of-SYNC detection when a transport channel is under out-of-SYNC for a long period of time (e.g., longer than the predetermined time period). The term "type-1" is explained in the next paragraph. This method can improve the RLC DAR performance and is transparent to the UTRAN network.

According to one aspect of the disclosure, type-1 out-of-SYNC transport channels may refer to those transport channels that are out-of-SYNC relative to other transport channel(s) for a period longer than the predetermined time period. For example, type-1 out-of-SYNC transport channels may refer to those transport channels whose out-of-SYNC timers have expired after a predetermined time period. The term "out-of-SYNC timer" will be described in more detail later. Type-2 out-of-SYNC transport channels may refer to those transport channels that are out-of-SYNC relative to other transport channel(s) for a period less than a predetermined time period.

The DAR unit 547 can reorder PDUs, detect duplicate PDUs, and eliminate duplicates. The reception buffer 545 can accumulate PDUs. The RLC header remover unit 543 can remove the RLC headers so that the headers are not sent to a Reed-Solomon (RS) decoder (not shown). The reassembly unit 541 can reassemble or reconstruct the SDUs. Once SDUs are successfully put together, the SDUs can be transmitted over a radio bearer 555 to deliver the SDUs to higher layers (e.g., RRC).

According to one aspect, the subject technology relates to multimedia broadcast multicast service (MBMS), radio link control (RLC), duplicate avoidance and reordering (DAR), window-based mechanism, and selection combining. One example of the conceptual mechanism of an algorithm is described according to one aspect of the subject technology.

A communication system may perform the following functions in accordance with one aspect of the subject technology:

Out-of-SYNC Avoidance: This may refer to finding a subset of transport channels (e.g., MTCHs) in SYNC with a data processing window (e.g., the current DAR window). This provides the following properties or advantages:
RLC PDU SNs are in SYNC.
Sequence number (SN) jump larger than the DAR_Window_Size is avoided.
It maximizes the overlapping area between the coming PDUs and the current DAR window. It can optimize the gain of the selective combining.
Out-of-SYNC Detection: This may refer to identifying a subset of transport channels, which are potentially out of SYNC for a long period of time.

Figure 6:
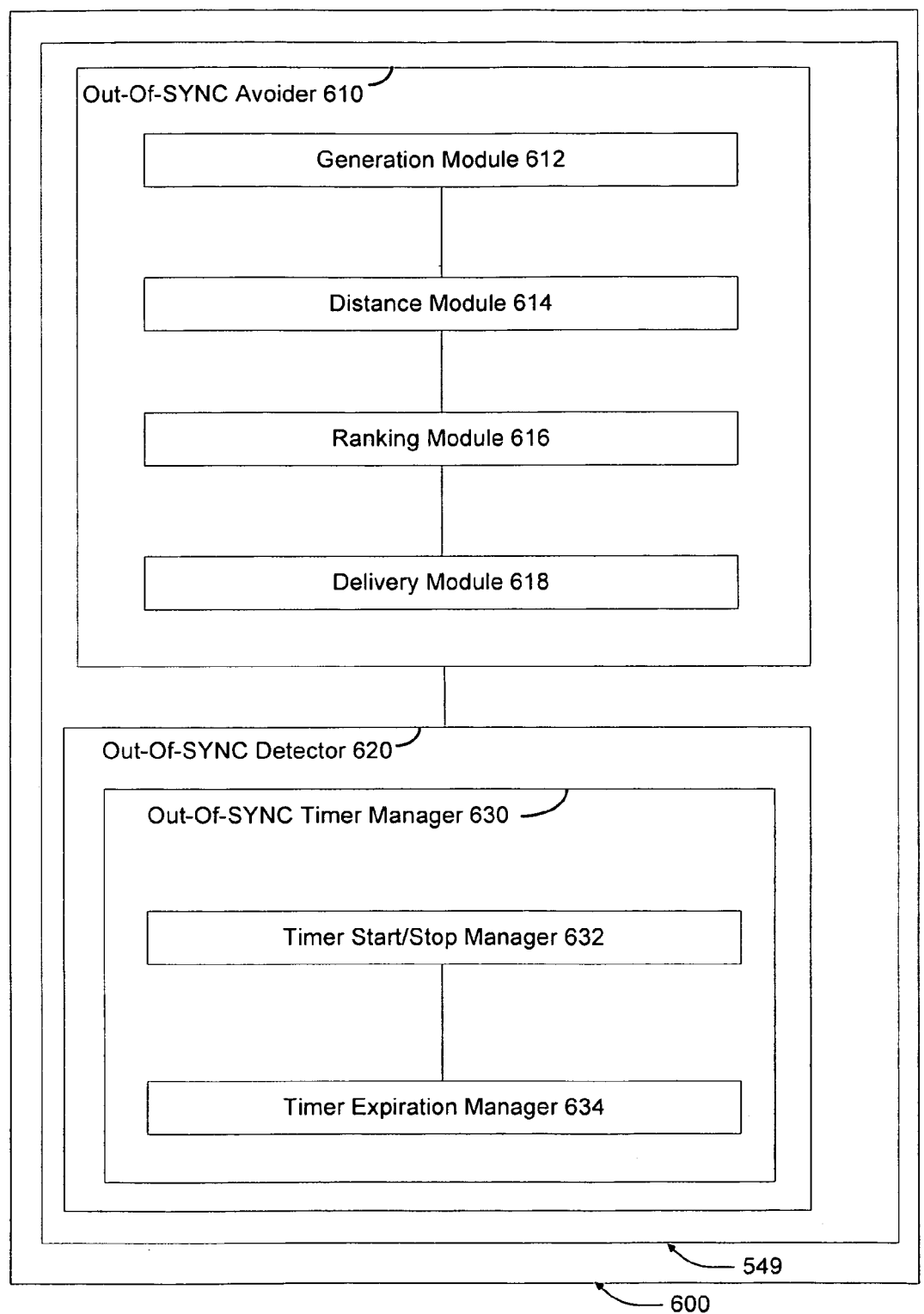
FIG. 6 is a diagram illustrating an example of a communication system.

FIG. 6 is a diagram illustrating an example of a communication system. A communication system 600 includes an out-of-SYNC avoider 610 and an out-of-SYNC detector 620. The out-of-SYNC avoider 610 may include a generation module 612, a distance module 614, a ranking module 616, and a delivery module 618. The out-of-SYNC detector 620 may include an out-of-SYNC timer manager 630, which includes a timer start/stop manager 632 and a timer expiration manager 634. The out-of-SYNC avoider 610 may filter out the data packets or data units arriving from the out-of-SYNC transport channels, and the out-of-SYNC detector 620 may call back a controller (e.g., an RRC 160 in FIG. 2) for a type-1 out-of-SYNC detection after a predetermined period of time.

The communication system 620 may operate using various window-based parameters and variables. The window-based parameters and variables may be based on SNs. These parameters and variables are described below according to one aspect of the disclosure. It should be noted that the term "window-based parameter" may refer to one or more window-based parameters and/or one or more window-based variables.

The window-based parameters may include, among others, the following two parameters that are configurable.

Predetermined window size ($W_{max}$): This may refer to, for example, a pre-selected maximum out-of-SYNC window size. This can be used as a criteria to determine if a combination set of transport channels is out of SYNC.

Out-of-SYNC timer (or Out_of_SYNC_Timer): This may refer to a timer used to determine if a certain transport channel is out of SYNC for a long period of time (e.g., longer than a predetermined time period) and to determine whether such finding needs to be reported to a controller (e.g., an RRC). For instance, when an out-of-SYNC timer expires, a data link layer (e.g., an RLC 150 in FIG. 2) calls back the controller (e.g., an RRC 160 in FIG. 2) to indicate that a type-1 out-of-SYNC transport channel has been detected.

The window-based variables may include, among others, the following three variables.

Distance value (W): This may refer to a sequence number distance of a combination set of transport channels in a given TTI. A distance value (W) may refer to the distance between the largest SN and the smallest SN of a given combination set of transport channels (i.e., the largest SN of a given combination set of transport channels—the smallest SN of the combination set of transport channels).

Jump value (g): This may refer to an SN jump amount from a data processing window (e.g., the current DAR window) to the smallest SN of a given combination set of transport channels.

Overlap value (h): This may refer to an overlapping SN area of a given combination set of transport channels and a processing window (e.g., the current DAR window).

Referring back to FIG. 6, the generation module 612 may be configured to generate all possible combination sets of transport channels. A combination set of transport channels may refer to a set of transport channels that may be utilized by a UE. A combination set of transport channels may include one or more transport channels.

For example, if there are three transport channels $M_1$, $M_2$, and $M_3$, then there may be seven possible combination sets of transport channels. These are shown below in Table 3.

TABLE 3

| Combination Set No. | Transport channels |
| --- | --- |
| 1 | $M_1$ |
| 2 | $M_2$ |
| 3 | $M_3$ |
| 4 | $M_1$, $M_2$ |
| 5 | $M_2$, $M_3$ |
| 6 | $M_1$, $M_3$ |
| 7 | $M_1$, $M_2$, $M_3$ |

The distance module 614 may be configured to determine a distance value (W) for a combination set of transport channels in a given TTI. This determination may be made for each of the combination sets generated by the generation module 612. The distance module 614 may be configured to select the combination set(s) whose distance value is less than a predetermined window size ($W_{max}$). This selection process can allow the distance module 614 to select the combination set(s) that are in SYNC based on the $W_{max}$ criteria. The transport channels included in the selected combination set(s) may be considered to be roughly in SYNC according to one aspect of the disclosure.

The ranking module 616 may be configured to determine the highest-ranking combination set based on the window-based parameters and/or variables. The highest-ranking combination set may be selected by any of the following methods according to one aspect of the disclosure. If the combination set that includes all of the transport channels (e.g., all of the transport channels utilized by a UE) has a distance value (W) that is less than a predetermined window size ($W_{max}$), then the ranking module 616 may select that particular combination set as the highest-ranking combination set. Otherwise, the ranking module 616 may determine the highest-ranking combination set based on jump values (g) and/or overlap values (h). For example, the ranking module 616 may select, as the highest-ranking combination set, a combination set having the smallest jump value (g) and the largest overlap value (h).

According to one aspect of the disclosure, the highest-ranking combination set may be considered to be an in-SYNC set ($\beta$), and the other combination sets (i.e., the combination sets that are not in the highest-ranking combination set) may be considered to be an out-of-SYNC set (e.g., $\beta^c$).

The delivery module 618 may be configured to selectively provide data packets or data units (e.g., PDUs). For example, it can filter out the data packets arriving from transport channels that are out-of-SYNC and thus provide data packets from the transport channels in the highest-ranking combination set to a window-based data processing unit (e.g., a DAR unit 547 in FIG. 5), without providing data packets from out-of-SYNC transport channels to the window-based data processing unit. The delivery module 618 may provide the data streams of the data units (e.g., PDU streams) to a data processing unit (e.g., a DAR unit) in an ascending SN order to reduce the number of data units (e.g., PDUs) that become discarded.

In the above example, the highest-ranking combination set includes one combination set. In another example, the highest-ranking combination set may include multiple combination sets. For instance, the ranking module 616 may select multiple high-ranking combination sets by selecting, for example, combination sets having jump values below a maximum jump value and overlap values above a minimum overlap value. The delivery module 618 may provide data packets or data units in the selected high-ranking combination sets to a data processing unit.

Still referring to FIG. 6, the timer start/stop manager 632 may be configured to stop an out-of-SYNC timer of each of the transport channels in the in-SYNC set (e.g., the highest-ranking combination set). The timer start/stop manager 632 may also start an out-of-SYNC timer of each of the transport channels in the out-of-SYNC set (e.g., all of the combination sets that are not in the highest-ranking combination set). In one aspect of the disclosure, the timer start/stop manager 632 may utilize one out-of-SYNC timer per transport channel.

When any one of the out-of-SYNC timers expires (e.g., at least one of the transport channels in the out-of-SYNC set has been out of SYNC for a period longer than a pre-selected timer expiration amount), the timer expiration manager 634 may provide a type-1 out-of-SYNC transport channel detection indication to another module (e.g., a higher layer such as an RRC 160 in FIG. 2). If multiple out-of-SYNC timers expire, then the timer expiration manager 634 may sort the type-1 out-of-SYNC transport channels in a predetermined order (e.g., in a descending order of the overlap value (g)). A controller or a controller module such as the RRC 160 in FIG. 2 can remove all or some of the type-1 out-of-SYNC transport channels and select other transport channels for communication (e.g., one or more transport channels from neighbor cells or neighbor Node B's).

According to one aspect of the disclosure, an operation of a communication system 600 for out-of-SYNC avoidance and detection may be described as follows:

1. Find all possible combination sets of transport channel that are roughly in SYNC based on a $W_{max}$ criteria.
2. Find the highest-ranking combination set of transport channels, β. For example, this can be a combination set that includes all of the transport channels and that has a distance value (W) less than $W_{max}$; or this can be a combination set (i) having a distance value (W) less than $W_{max}$ and (ii) having the smallest g and the largest h among all combination sets.
3. Pass only the data packets or data units (e.g., PDUs) in the β set to a data processing unit (e.g., a DAR unit).
4. Deliver the data streams (e.g., PDU streams) to the data processing unit (e.g., the DAR unit) that utilizes a window mechanism in an ascending SN order to reduce the number of data packets or data units (e.g., PDUs) that become discarded.
5. Identify the transport channels that are not in β as out-of-SYNC transport channels. In other words, treat the complementary set ($β^c$) of the highest-ranking combination set to be an out-of-SYNC set.
6. Start the out-of-SYNC timers of the transport channels that are in the out-of-SYNC set (e.g., out-of-SYNC transport channels).
7. Stop the out-of-SYNC timers of the transport channels that are in an in-SYNC set (e.g., the highest-ranking combination set).
8. If any of the out-of-SYNC timers that has been running expires after a predetermined time period, notify a controller (or a controller module) such as an RRC 160 in FIG. 2 that a type-1 out-of-SYNC transport channel has been detected.
9. If a plurality of out-of-SYNC timers expire, a module (e.g., an RLC 150 in FIG. 2) sorts the type-1 out-of-SYNC transport channel list, for example, in a descending order of the overlap value (g)).
10. A controller such as an RRC 160 in FIG. 2 can remove the type-1 out-of-SYNC transport channel(s) and select one or more transport channels from other neighbor cells.

Figure 7:
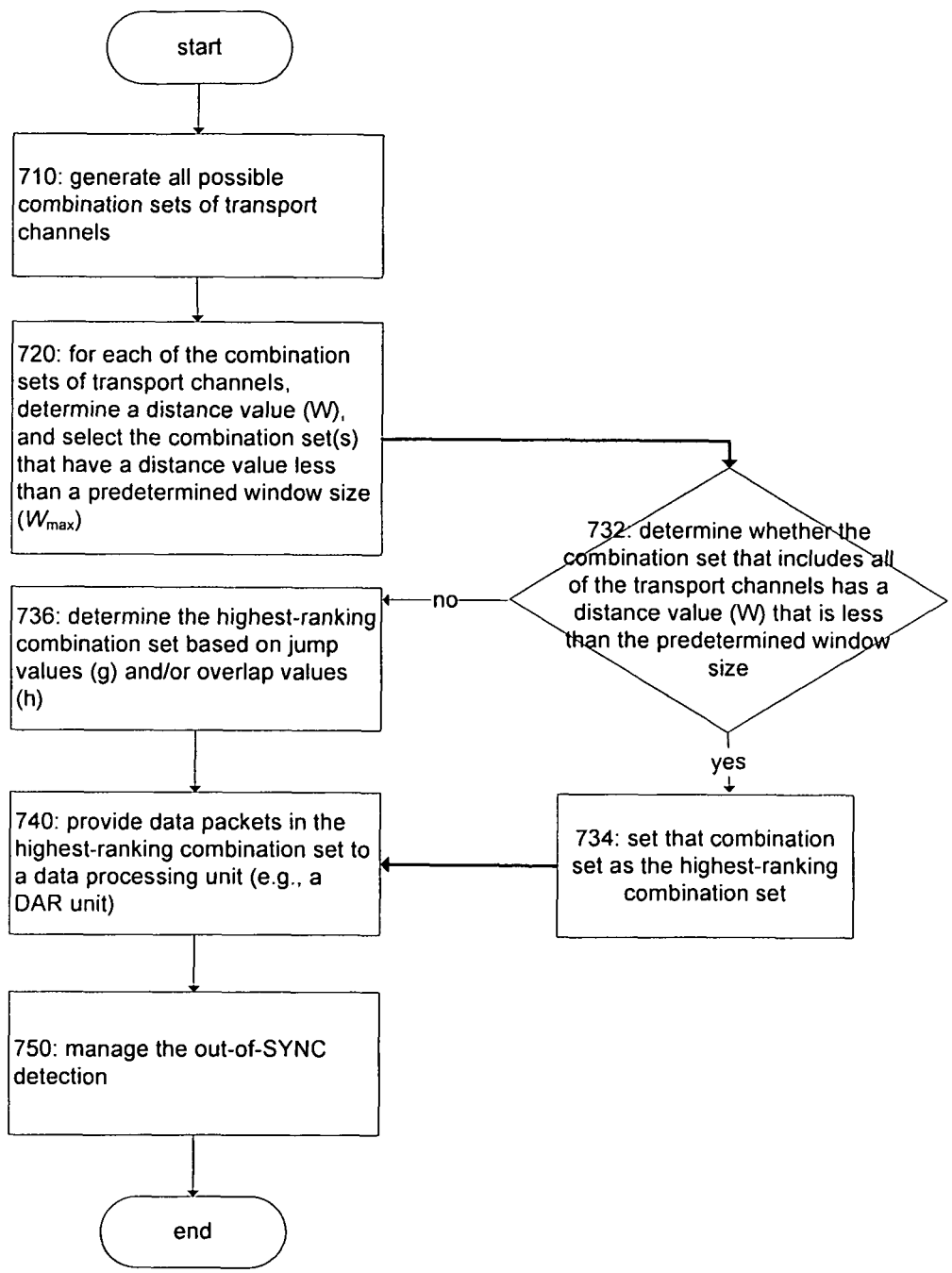
FIG. 7 is a flow chart illustrating an example of an out-of-SYNC avoidance and detection operation according to one aspect of the disclosure.

FIG. 7 is a flow chart illustrating an example of an out-of-SYNC avoidance and detection operation according to one aspect of the disclosure. At block 710, all possible combination sets of transport channels are generated. This may be performed by, for example, the generation module 612 of FIG. 6. At block 720, for each of the combination sets of transport channels in a given TTI, a distance value (W) is determined, and the combination set(s) that have a distance value less than a predetermined window size ($W_{max}$) are selected. The operation described for block 720 may be performed by, for example, the distance module 614 of FIG. 6.

At blocks 732, 734, and 736, the highest-ranking combination set is determined based on the window-based parameters and/or variables. At block 732, a determination is made as to whether the combination set that includes all of the transport channels (e.g., all of the transport channels utilized by a UE) has a distance value (W) that is less than a predetermined window size ($W_{max}$). If yes, then at block 734, that combination set is set as the highest-ranking combination set. Otherwise, at block 736, the highest-ranking combination set is determined based on jump values (g) and/or overlap values (h). For example, at block 736, a combination set having the smallest jump value (g) and the largest overlap value (h) among all of the combination sets may be selected as the highest-ranking combination set. The operations described for blocks 732, 734, and 736 may be performed by, for example, the ranking module 616 of FIG. 6.

At block 740, data packets or data units in the highest-ranking combination set is provided to the next data processing unit (e.g., a DAR unit). The data packets (sometimes referred to as data units or data streams) may be provided to the next data processing unit in an ascending SN order to reduce the number of data units that become discarded. The operation described for block 740 may be performed by, for example, the delivery module 618 of FIG. 6.

At block 750, the out-of-SYNC detection is managed. When type-1 out-of-SYNC transport channel(s) are detected, an indication of such detection may be notified to a controller. The operation described for block 750 may be performed by, for example, the out-of-SYNC detector 620 or the out-of-SYNC timer manager 630 of FIG. 6. The controller may remove the type-1 out-of-SYNC transport channel(s) and select new transport channel(s).

Figure 8:
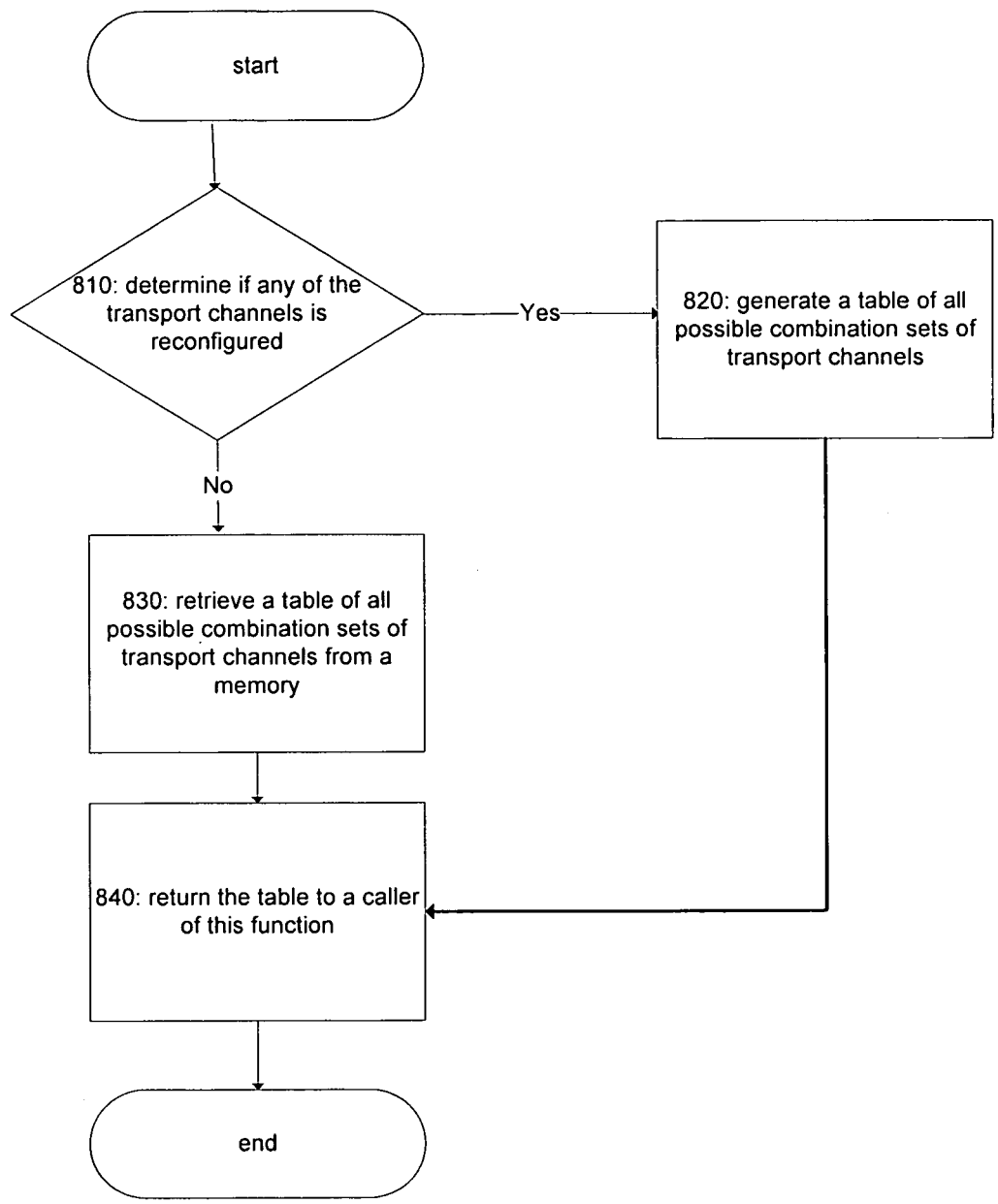
FIG. 8 is a flow chart illustrating an example of an operation (e.g., block 710 of FIG. 7) for generating all possible combination sets of transport channels according to one aspect of the disclosure.

FIG. 8 is a flow chart illustrating an example of an operation (e.g., block 710 of FIG. 7) for generating all possible combination sets of transport channels according to one aspect of the disclosure. At block 810, a determination is made as to whether any of the transport channels is reconfigured (e.g., some or all of the transport channels have been removed, or new transport channel(s) are added). If yes, then at block 820, a table (e.g., Table 3) of all possible combination sets of transport channels is generated. If no, then at block 830, a table of all possible combination sets of transport channels is retrieved from a memory (e.g., 318 or 310 in FIG. 3). At block 840, the table (either a new table generated or the old table retrieved) is returned to a caller of this function (i.e., a function for generating all possible combination sets of transport channels).

Figure 9:
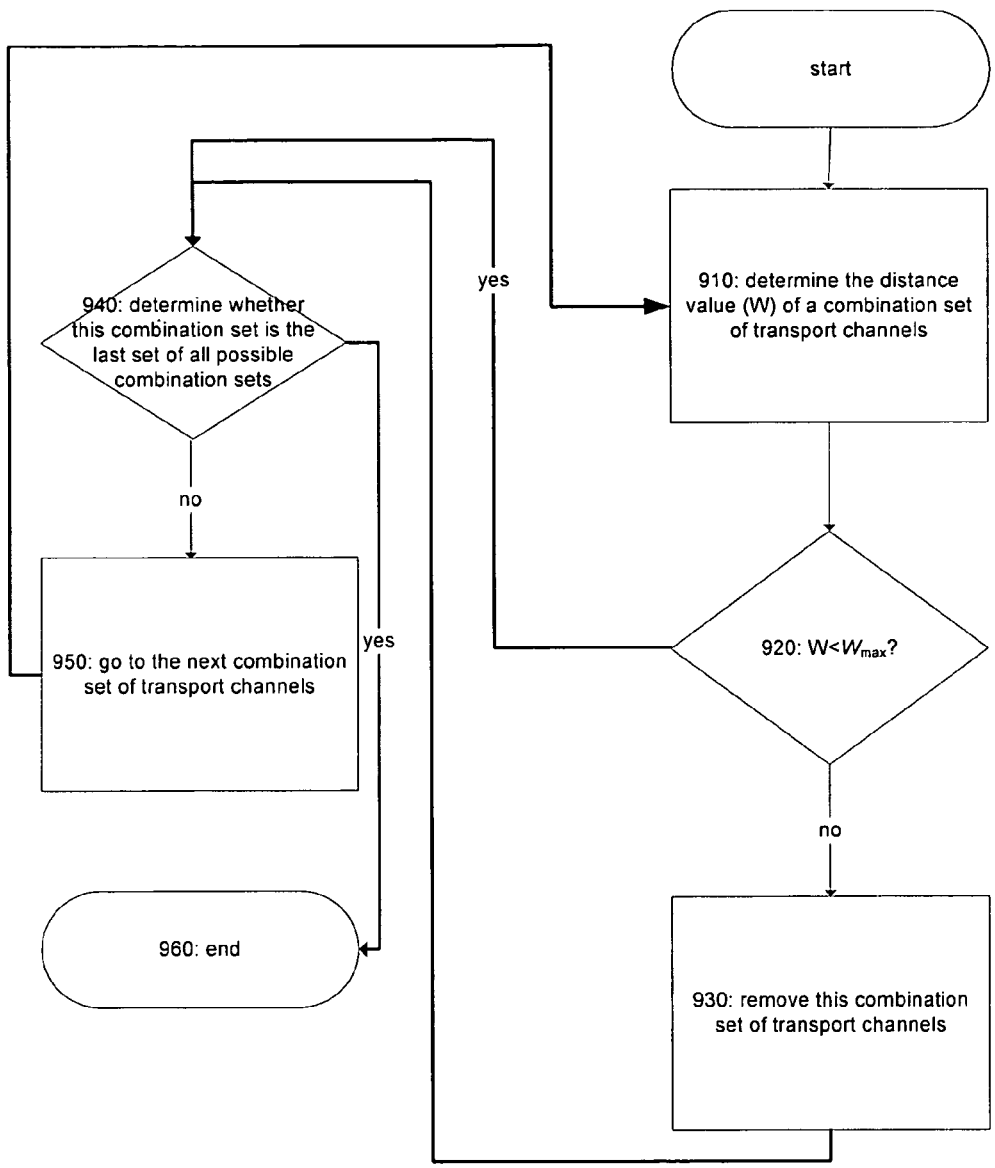
FIG. 9 is a flow chart illustrating an example of an operation (e.g., block 720 of FIG. 7) for determining the distance value (W) of each of the combination sets of transport channel and selecting the combination set(s) that have a distance value less than a predetermined window size ($W_{max}$) according to one aspect of the disclosure.

FIG. 9 is a flow chart illustrating an example of an operation (e.g., block 720 of FIG. 7) for determining the distance value (W) of each of the combination sets of transport channel and selecting the combination set(s) that have a distance value less than a predetermined window size ($W_{max}$) according to one aspect of the disclosure. The operation described with reference to FIG. 9 is performed for each combination set of transport channels. At block 910, the distance value (W) of a combination set of transport channels is determined. At block 920, a determination is made as to whether the distance value (W) is less than a predetermined window size ($W_{max}$). If no, then at block 930, this combination set of transport channels is removed from the working group of combination sets. In other words, this combination set is filtered out and is not selected. If yes, then this combination set of transport channels is selected for further processing. At block 940, a determination is made as to whether this combination set is the last set of all possible combination sets. If yes, then the operation ends at block 960. If no, then at block 950, the next combination set is brought in for computation, and the operation proceeds to block 910.

Figure 10:
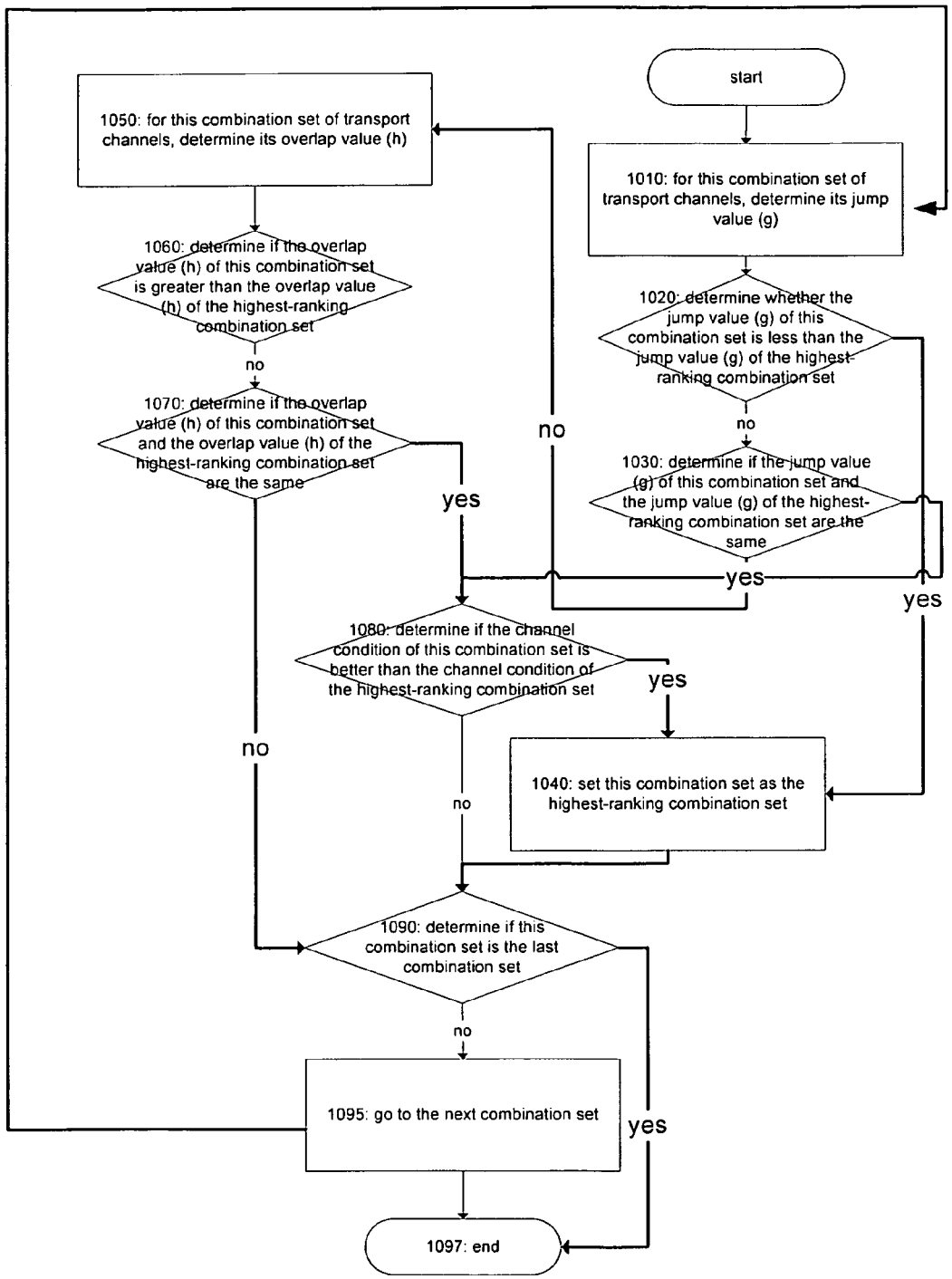
FIG. 10 is a flow chart illustrating an example of an operation (e.g., block 736 of FIG. 7) for determining the highest-ranking combination set based on jump values (g) and/or overlap values (h) according to one aspect of the disclosure.

FIG. 10 is a flow chart illustrating an example of an operation (e.g., block 736 of FIG. 7) for determining the highest-ranking combination set based on jump values (g) and/or overlap values (h) according to one aspect of the disclosure. At block 1010, for a given combination set of transport channels, its jump value (g) is determined. At block 1020, a determination is made as to whether the jump value (g) of this combination set is less than the jump value (g) of the highest-ranking combination set. At block 1030, a determination is made as to whether the jump value (g) of this combination set and the jump value (g) of the highest-ranking combination set are the same or equal. If the determination at block 1020 is positive (yes), then at block 1040, this combination set of transport channels is set as the highest-ranking combination set.

At block 1050, for this combination set of transport channels, its overlap value (h) is determined. At block 1060, a determination is made as to if the overlap value (h) of this combination set is greater than the overlap value (h) of the highest-ranking combination set. At block 1070, a determination is made as to whether the overlap value (h) of this combination set and the overlap value (h) of the highest-ranking combination set are the same. At block 1080, a determination is made as to whether the channel condition of this combination set is better than the channel condition of the highest-ranking combination set. If the determination at block 1080 is positive (yes), then at block 1040, this combination set of transport channels is set as the highest-ranking combination set. At 1090, a determination is made as to whether this combination set is the last combination set. If no, then at block 1095, the operation goes to the next combination set of transport channels. If yes, then the process ends at block 1097.

Figure 11:
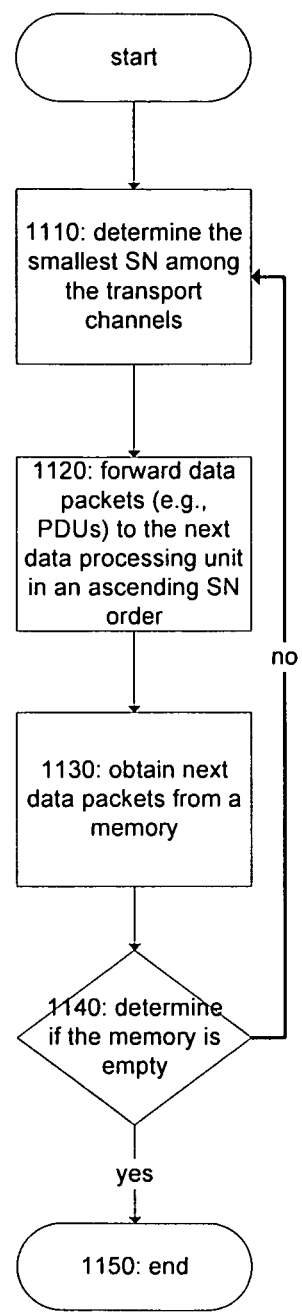
FIG. 11 is a flow chart illustrating an example of an operation (e.g., block 740 of FIG. 7) for providing data packets in the highest-ranking combination set to the next data processing unit (e.g., a DAR unit) according to one aspect of the disclosure.

FIG. 11 is a flow chart illustrating an example of an operation (e.g., block 740 of FIG. 7) for providing data packets in the highest-ranking combination set to the next data processing unit (e.g., a DAR unit) according to one aspect of the disclosure. At block 1110, the smallest SN among the transport channels in the highest-ranking combination set is determined. At block 1120, data packets (e.g., PDUs) are forwarded to the next data processing unit in an ascending SN order. At block 1130, the next data packets are obtained from a memory (e.g., 318 or 310 in FIG. 3). At block 1140, a determination is made as to whether the memory is empty. If yes, then the process ends at block 1150. If no, then the process continues to block 1110.

Figure 12:
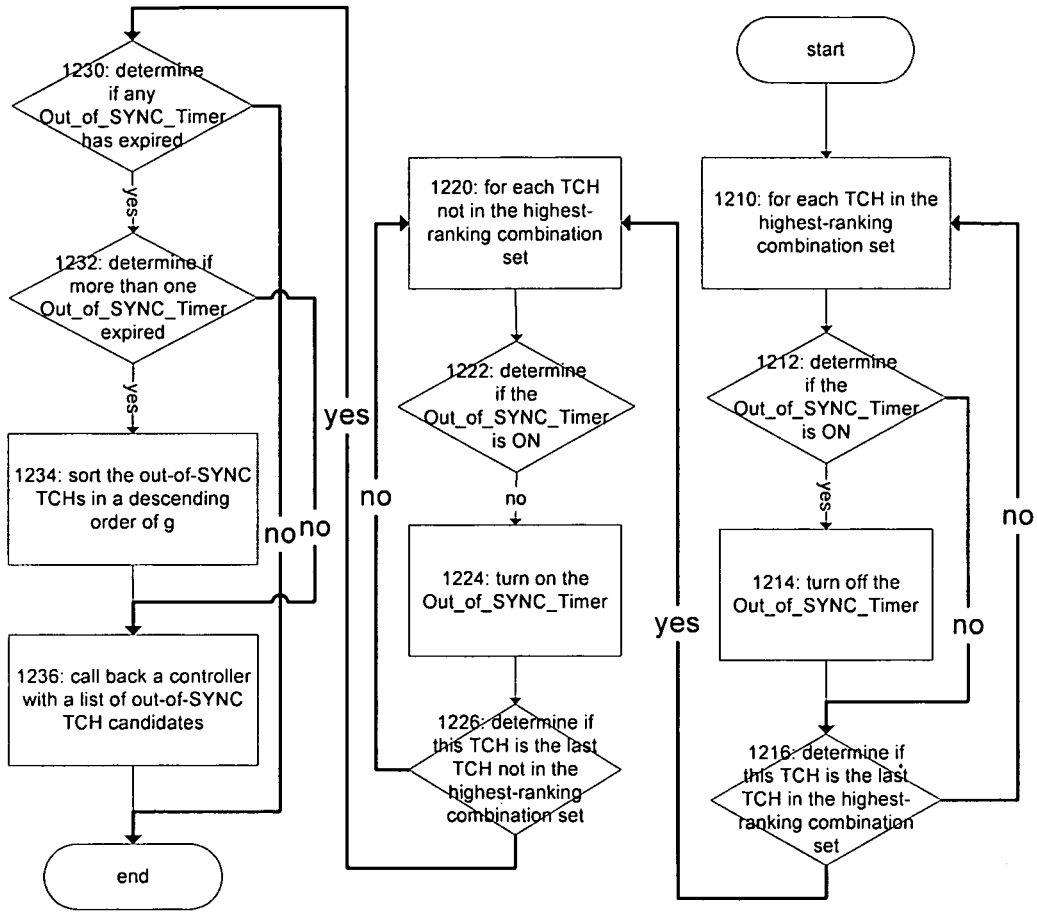
FIG. 12 is a flow chart illustrating an example of an operation (e.g., block 750 of FIG. 7) for managing the out-of-SYNC detection according to one aspect of the disclosure.

FIG. 12 is a flow chart illustrating an example of an operation (e.g., block 750 of FIG. 7) for managing the out-of-SYNC detection according to one aspect of the disclosure. At block 1210, the process begins for each transport channel in the highest-ranking combination set. At block 1212, a determination is made as to whether the Out_of_SYNC_Timer is ON for this given transport channel. If the determination is positive (yes), then at block 1214, the Out_of_SYNC_Timer for the transport channel is turned off. At block 1216, a determination is made as to whether this transport channel is the last transport channel in the highest-ranking combination set. If yes, the process moves to block 1220. If no, then the process goes back to block 1210.

At block 1220, the process continues for each transport channel not in the highest-ranking combination set. In other words, the process continues for each transport channel in the out-of-SYNC set. At block 1222, a determination is made as to whether the Out_of_SYNC_Timer is ON for the transport channel. If yes, then at block 1224, the Out_of_SYNC_Timer for that transport channel is turned on. At block 1226, a determination is made as to whether this transport channel is the last transport channel in the out-of-SYNC set (i.e., not in the highest-ranking combination set). If yes, then the process moves to block 1230. If no, then the process goes back to block 1220.

At block 1230, a determination is made as to whether any Out_of_SYNC_Timer has expired. If yes, then at block 1232, a determination is made as to whether more than one Out_of_SYNC_Timer has expired. If yes, then at block 1234, the type-1 out-of-SYNC transport channels are sorted in a descending order of g. At block 1236, a controller (e.g., RRC) may be provided with a list of type-1 out-of-SYNC transport channel candidates.

According to one aspect of the disclosure, an example of an operation for out-of-SYNC avoidance and detection is described below in pseudo code:

```
Configuration:
Assume there are three transport channels, {M1,M2,M3}
DAR_Window_Size = 4
n = 2 // n is the maximum number of blocks from a transport channel per
TTI
Wmax = 9
// For this example, there are 7 possible combination sets of transport
channels, as shown in Table 3 above.
at time T−1,
no Out_of_SYNC_Timer is being started
VR(UDH) = 10
VR(UDR) = 7
at time T,
M1 = {7,8} //Transport channel M1 has PDU 7 and PDU 8.
M2 = {11,12} //Transport channel M2 has PDU 11 and PDU 12.
M3 = {17,18} //Transport channel M3 has PDU 17 and PDU 18.
∵ Wo({M1,M3})≥ Wmax and Wo({M1,M2,M3})≥ Wmax
// The distance value (W) of Combination Set No. 6, which includes M1,
M3, is 18 − 7, which is 11. This is not less than 9 (Wmax).
// The distance value (W) of Combination Set No. 7, which includes M1,
M2, M3, is 18 − 7, which is 11. This is not less than 9 (Wmax).
∴ Φ = {{M1},{M2},{M3},{M1,M2},{M2,M3}} = {α1,α2,...α5}
// Only Combination Set Nos. 1, 2, 3, 4, and 5 (which are α1, α2, α3, α4,
α5) have distance values that are less than 9 (Wmax).
// The g and h values of Combination Set Nos. 1, 2, 3, 4, and 5 (which are
α1, α2, α3, α4, α5) are provided below:
g(α1) = 7 − 10 = −3
h(α1) = 8 − 7 + 1 = 2
g(α2) = 11 − 10 = 1
h(α2) = 0
g(α3) = 17 − 10 = 7
h(α3) = 0
g(α4) = 7 − 10 = −3
h(α4) = 10 − 7 + 1 = 4
g(α5) = 11 − 10 = 1
h(α5) = 0
// The distance value (W) of Combination Set No. 7 (α7) is not less than
Wmax. Therefore, even though α7 includes all of the transport channels,
it is not the highest-ranking combination set.
// Since α4 has the smallest g and the largest h, α4 is the highest-ranking
combination set.
// α4 includes M1, M2. But α4 does not include M3. Thus, M3 is not in the
highest-ranking combination set.
start Out_of_SYNC_Timer(M3) // The out-of-SYNC timer for M3 is
started.
stop Out_of_SYNC_Timer(M1) // The out-of-SYNC timer for M1 is
stopped.
stop Out_of_SYNC_Timer(M2) // The out-of-SYNC timer for M2 is
stopped.
if Out_of_SYNC_Timer(M3) expires, call back RRC for a type-1
out-of-SYNC transport channel detection
```

Another example of an operation for out-of-SYNC avoidance and detection is described below according to one aspect of the disclosure. Variables and functions utilized in this example are described as follows:

$S_{ij}$: the SN of the i-th transport channel and the j-th RLC PDU, j=1,2, ... J $$S_{ij} < S_{i(j+1)}$$

n: maximum number of blocks from a transport channel per TTI $$J \leq n$$

$$M_i = \{S_{i1}, S_{i2}, \ldots S_{iJ}\}$$

the i-th transport channel set, i=1,2, ... I,
the transport channel set is a set of SN of RLC PDU passing to the RLC DAR unit $$\Psi = \{M_1, M_2, \ldots M_I\}$$

a complete set of transport channels for the MBMS service
    it is initiated to hold the complete set of transport channels when the RLC is established
G: a function to generate all combination sets $$G(M_i,\{A_{i'}\})=\{\{M_i\},A_{i'},M_i \cup A_{i'}\}\ i'=1,2,\ldots A_{i'} \in \Psi$$

example:

$$G(M_1,\{\{M_2\},\{M_3\},\{M_2,M_3\}\})=\{\{M_1\},\{M_2\},\{M_3\},\{M_2,M_3\},\{M_1,M_2\},\{M_1,M_3\},\{M_1,M_2,M_3\}\}$$

$f_a$: a function to calculate smallest SN of a combination set A, A ∈ Ψ

$$f_a(A)=\{S_{i1}: \exists M_i \in A \ \& \ S_{i1} \leq S_{p1}, \forall M_p \in A\}$$

$f_b$: a function to calculate largest SN of a combination set A, A ∈ Ψ

$$f_b(A)=\{S_{i,J}: \exists M_i \in A \ \& \ S_{i,J} \geq S_{p,J}, \forall M_p \in A\}$$

$W_o$: a function to calculate the out-of-SYNC window among multiple transport channels
    Out-of-SYNC window is the difference of the largest and smallest SN among multiple transport channels $$W_o(A)=\{f_b(A)-f_a(A): M_i, M_{i'} \in A\}$$

example:

$M_1 = \{1, 3, 4\}$ $M_2 = \{4, 6, 7\}$ $A = \{M_1, M_2\}$ $W_O(A) = \max(S_{1,J}, S_{2,J}) - \min(S_{11}, S_{21})$
$= \max(4, 7) - \min(1, 4) = 6$ $W_{max}$: maximum out-of-SYNC window size
    a configurable value to adjust the strictness of the out-of-SYNC detection $W_{max} > 2 \times DAR\_Window\_Size$ is true if $W_{max} > 2 \times DAR\_Window\_Size$ and $W_o(A) \geq W_{max}$, the RLC DAR can lose $W_o(A)-DAR\_Window\_Size-n+1$ number of PDU every TTI regardless of the BLER performance
    example:
        DAR_Window_Size=4
        n=2
        0% BLER $A=\{M_1,M_2\}$ $M_1=\{11,12\}, M_2=\{19,20\}$
    $M_1$ is 8 PDUs delay of $M_2$
    Initially, VR(UDH)=11, VR(UDR)=11−4+1=8

$W_o=20-11=9>2\times DAR\_Window\_Size$

After processing $M_1$ and $M_2$ in the DAR unit, VR(UDH)=20, VR(UDR)=20−4+1=17
    Number of RLC PDUs lost is 17−(12+1)=4

$W_o(A)-DAR\_Window\_Size-n+1=9-4-2+1=4$ $\alpha_l$: a subset of R that are in SYNC, l=1,2, ... L $$\alpha_l=\{M_i: \forall M_i \in \alpha_l \ \& \ W_o(\alpha_l) < W_{max}\}$$

$$\Psi = \bigcup_{l=1}^{L} \alpha_l$$

$\alpha_i = M_i$ i=1,2, ... I
    All $M_i$'s itself are in SYNC because n<DAR_Window_Size $\Phi=\{\alpha_1,\alpha_2,\ldots,\alpha_L\}$
    a set to contain all the combination sets of $\alpha_l$
g: a function to calculate the distance of the SN jump by set A, A ∈ Ψ

$g(A)=f_a(A)-VR(UDH)$ if g is negative, then A is overlapping the current DAR window
h: a function to calculate the distance of the SN overlapped with the DAR window by a set A, A ∈ Ψ

$$h(A) = \begin{cases} 0 & g(A) > 0 \\ |g(A)|+1 & g(A) \leq 0 \ \& \ f_a(A) \geq VR(UDR) \ \& \ f_b(A) \geq VR(UDH) \\ VR(UDH)-VR(UDR)+1 & g(A) \leq 0 \ \& \ f_a(A) < VR(UDR) \ \& \ f_b(A) \geq VR(UDH) \\ f_b(A)-f_a(A)+1 & g(A) \leq 0 \ \& \ f_a(A) \geq VR(UDR) \ \& \ f_b(A) < VR(UDH) \\ f_b(A)-VR(UDR)+1 & g(A) \leq 0 \ \& \ f_a(A) < VR(UDR) \ \& \ f_b(A) < VR(UDH) \end{cases}$$

CH: a function to determine the overall channel quality of set A, A ∈ Ψ
    The channel quality can be based on the following:
        the average pilot signal to noise ratio
        the average BLER
    if CH(A)>CH(B), the channel quality at A is better than B
β: a subset of A such that $\beta=\alpha_l$ $f_b(\beta) \geq VR(UDR)$ $$g(\beta) = \min_{l=1}^{L}[g(\alpha_l)]$$

$$h(\beta) = \max_{l=1}^{L}[h(\alpha_l)]$$

γ: a subset of Ψ such that it is not in the β set of the last TTI of data
    γ is initiated to an empty set, φ, when the RLC is established
θ: a subset of Ψ such that it is in the β and γ set
    a set of transport channels which are in SYNC now but was out of SYNC before $\theta=\beta \cap \gamma$ η: a subset of Ψ such that it is not in the β and γ set
    a set of transport channels which are out of SYNC now but was in SYNC till the last TTI of data $\eta=\beta^C \cap \gamma^C$ Ω: a subset of Ψ such that their Out_of_SYNC_Timer are started and expired when the Out_of_SYNC_Timer is expired, RLC informs RRC about the transport channel being out of SYNC Out_of_SYNC_Timer: a timer per transport channel to determine if the transport channel is out of SYNC the timer is started when the transport channel enters into the $\beta^C$ when the timer is expired, the RLC calls back RRC for the transport channel being out of SYNC An operational example is described below in pseudo code:

```
/***** generate all α_l *****/
Φ = {{M_I}}
//loop through transport channel from I-1 to 1
for (i=I-1; i>0; i--)
{
        Φ = G(M_i,Φ)
        //set X as an empty set
        X = φ
        //remove out the out-of-SYNC set
        for l=1 to L
        {
                if W_o(α_l)<W_max
                        X = X ∪ α_l
        }
        Φ = X
}
/***** find β *****/
β = φ
//loop through all α_l from 1 to L
for(l=1; l<L; l++)
{
        if f_b(α_l)≥VR(UDR)
        {
                if β == φ
                {
                        β = α_l
                }
                else
                {
                        if g(β)> 0
                        {
                                if g(α_l)< g(β)
                                        β = α_l
                                if g(α_l) == g(β)
                                {
                                        /* compare the number of transport channels in
                                        α_l and β or the channel quality*/
                                        if |α_l|>|β| OR ( |α_l| == |β| AND
                                CH(α_l)> CH(β) )
                                                β = α_l
                                }
                        }
                        if g(β)≤ 0 AND g(α_l)≤0
                        {
                                if h(α_l)> h(β)
                                        β = α_l
                                if h(α_l) == h(β)
                                {
                                        /*compare the number of transport channels in
                                        α_l and β or the channel quality */
                                        if |α_l|>|β| OR ( |α_l| == |β| AND
                                CH(α_l)> CH(β) )
                                                β = α_l
                                }
                        }
                }
        }
}
//only forward the PDUs in β to the DAR unit in an ascending SN order
RLC_DAR(β)
/*****manage the Out_of_SYNC_Timer*****/
//stop the timer if the transport channel enters back to β
θ = β ∩ γ
for each M_i ∈ θ
        stop the Out_of_SYNC_Timer (M_i)
//stop the timer if the transport channel is not in β and γ, i.e., out-of-SYNC and timer
is not started yet
η = β^C ∩ γ^C
for each M_i ∈ η
        start the Out_of_SYNC_Timer(M_i)
Ω = φ
for each M_i ∈ Ψ
{
        if Out_of_SYNC_Timer(M_i) is expired
```

-continued

```
        Ω = Ω ∩ M_i
}
//if Ω has at least one transport channel
if |Ω|> 0
        if |Ω|> 1
                sort Ω in descending order of g(.)
                //call back RRC for a set of type-1 out-of-SYNC transport channels detected
                RRC->Out_of_SYNC_transport channel(Ω)
//update γ
γ = β^C
```

Figure 13:
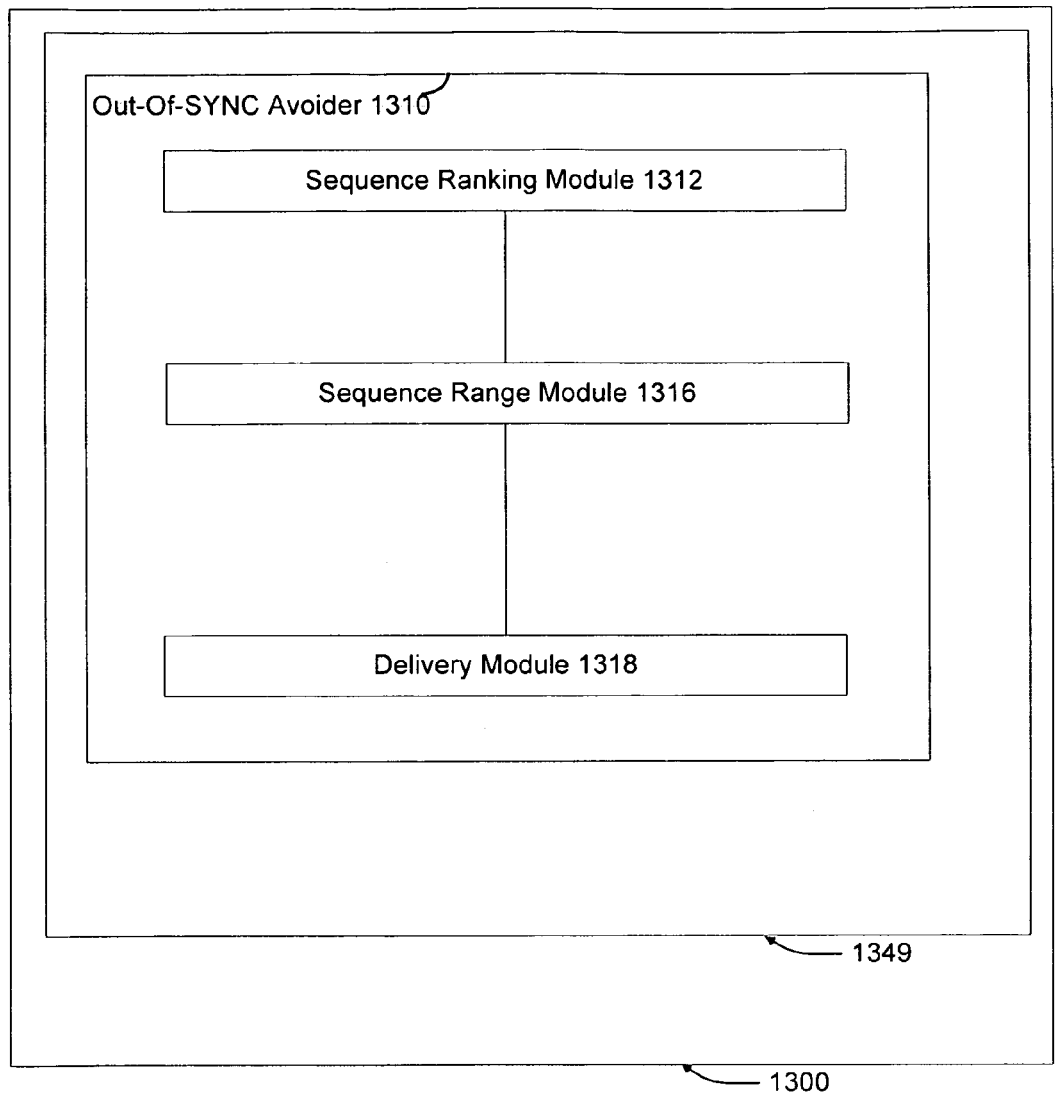
FIG. 13 is a diagram illustrating an example of a communication system.

FIG. 13 is a diagram illustrating an example of a communication system. A communication system 1300 includes an out-of-SYNC avoidance and detection unit 1349, which includes an out-of-SYNC avoider 1310. The out-of-SYNC avoider 1310 may include a sequence ranking module 1312, a sequence range module 1316, and a delivery module 1318. A sequence ranking module 1312 may be configured to determine the highest sequence number of data packets received from all transport channels utilized by the communication system 1300. These data packets may include data packets received within one transmission time interval. A sequence range module 1316 may be configured to determine a range of sequence numbers based on the highest sequence number and a window size of a window-based data processing unit (e.g., a DAR unit 547 in FIG. 5). A delivery module 1318 may be configured to provide, to the window-based data processing unit without providing data packets that are outside the range of sequence numbers, data packets that are within the range of sequence numbers and that are available to the delivery module.

The range of sequence numbers may be consecutive sequence numbers including the highest sequence number. The range of sequence numbers may be determined by subtracting S2 from S1, wherein S1 is the highest sequence number, and S2 is S1 minus the window size of the window-based data processing unit plus one.

According to one aspect of the disclosure, an example of an operation of the out-of-SYNC avoider 1310 is described below. An out-of-SYNC avoider 1310 may determine the highest sequence number, S1, among the PDUs received from all of the transport channels at a given TTI. The out-of-SYNC avoider 1310 may then supply PDUs having sequence numbers between S1 and S2, inclusively, where S2 is the highest sequence number minus the window size of a processing unit (e.g., the window size of the processing unit that is subsequent to the unit 1310, which can be a DAR unit 547) plus one. If one or more PDUs are missing within the sequence number range determined by S1 and S2, then the unit 1310 supplies only the available PDUs within the sequence number range.

Referring back to FIGS. 4A and 5, an example is illustrated. In this case, the highest sequence number, S1, is 18. The window size of a DAR unit 547 is 4. S2 is 15, which is determined as follows: S1 (18) minus the window size of the DAR unit 547 (4) plus 1. Accordingly, in this example, an out-of-SYNC avoidance and detection unit 549 tries to supply PDUs 15, 16, 17 and 18 to the DAR unit 547. However, because PDUs 15 and 16 are missing, the unit 547 supplies only the available PDUs, which are PDUs 17 and 18. In another example, if all four PDUs 15, 16, 17 and 18 are present, the unit 547 would supply PDUs 15, 16, 17 and 18 to the DAR unit 547.

Figure 14:
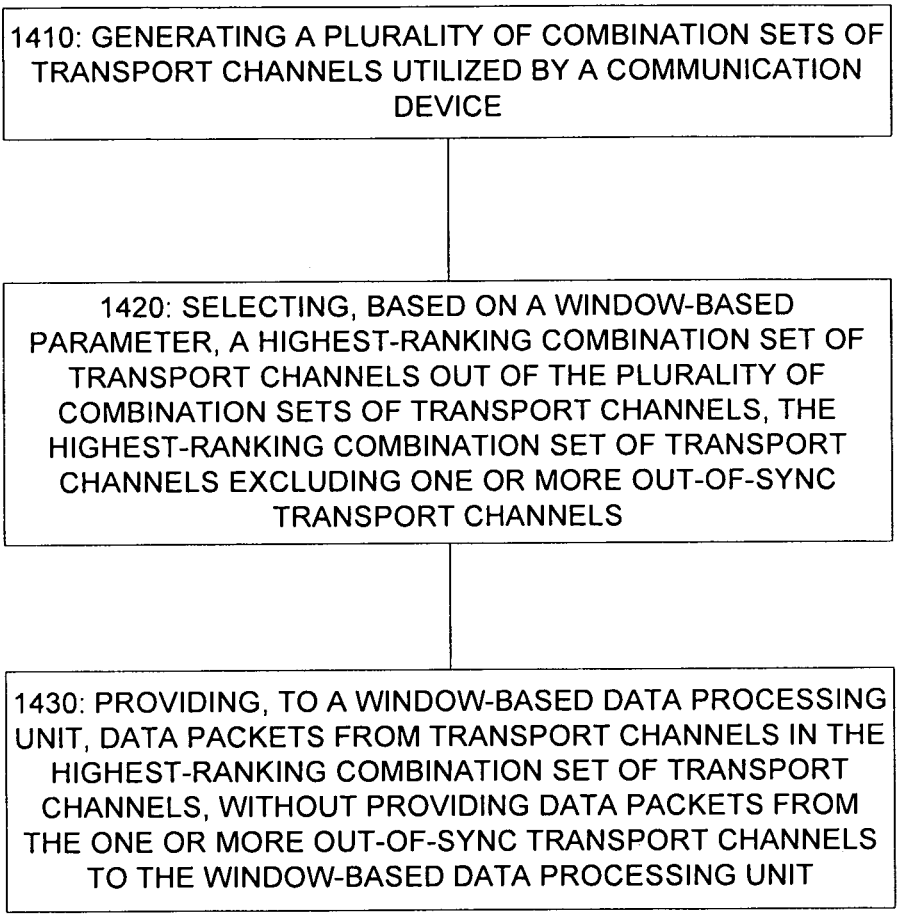
FIG. 14 is a flow chart illustrating an example of a method for handling out-of-SYNC.

FIG. 14 is a flow chart illustrating an example of a method for out-of-SYNC avoidance and/or detection. At operation 1410, a generation module (e.g., module 612 in FIG. 6) may generate a plurality of combination sets of transport channels utilized by a communication device. At operation 1420, a ranking module (e.g., module 616) may select, based on a window-based parameter, a highest-ranking combination set of transport channels out of the plurality of combination sets of transport channels, where the highest-ranking combination set of transport channels excludes one or more out-of-SYNC transport channels. At operation 1430, a delivery module (e.g., module 618) may provide, to a window-based data processing unit, data packets from transport channels in the highest-ranking combination set of transport channels, without providing data packets from the one or more out-of-SYNC transport channels to the window-based data processing unit.

A machine-readable medium (e.g., module 318 and/or 310 in FIG. 3) may comprise instructions executable by a processing system (e.g., module 302 in FIG. 3) in a communication device (e.g., unit 301 in FIG. 3 or unit 600 in FIG. 6). The instructions may comprise code for the operations described with reference to FIG. 14.

Figure 15:
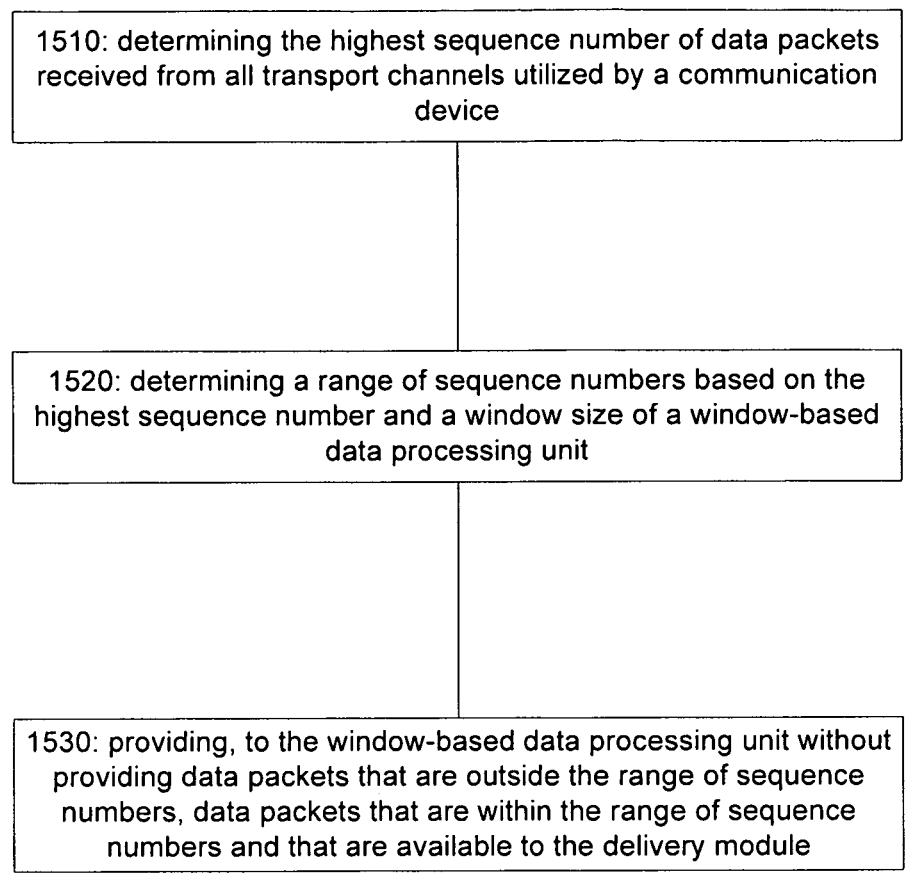
FIG. 15 is a flow chart illustrating an example of a method for out-of-SYNC avoidance.

FIG. 15 is a flow chart illustrating an example of a method for out-of-SYNC avoidance. At operation 1510, a sequence ranking module (e.g., module 1312 in FIG. 13) may determine the highest sequence number of data packets received from all transport channels utilized by a communication device (e.g., 301, 1300). At operation 1520, a sequence range module (e.g., module 1316) may determine a range of sequence numbers based on the highest sequence number and a window size of a window-based data processing unit. At operation 1530, a delivery module (e.g., module 1318) may provide, to the window-based data processing unit, data packets that are within the range of sequence numbers and that are available to the delivery module. The delivery module does not provide data packets that are outside the range of sequence numbers.

A machine-readable medium (e.g., module 318 and/or 310 in FIG. 3) may comprise instructions executable by a processing system (e.g., module 302 in FIG. 3) in a communication device (e.g., unit 301 in FIG. 3 or unit 1300 in FIG. 13). The instructions may comprise code for the operations described with reference to FIG. 15.

A UE can selectively combine the data packets from multiple transport channels or data links by using a window-based mechanism that utilizes sequence numbers. A window-based mechanism allows a continuous stream of data packet to be formed. A window may be a buffer at a UE, and a window can allow the data packets, which arrive earlier from one transport channel or data link, to wait for the other transport channels or data links. This facilitates selectively combining of data packets. This selective combining technique is used in a broadcast/multicast environment.

Due to the best effort type network and the varying latency in the core network (e.g., SGSN/RNC) and RNC/Node B, it is possible that the transport channels from any Node B have relative delays to each other larger than the DAR_Window_Size. When the transport channels are out of SYNC, the DAR performance can be degraded. The DAR_Window_Size may not maintain all the out-of-sequence PDUs. A continuous and in-sequence PDU streams would be difficult to form. [00105] When any of the transport channels is out of SYNC, it would potentially degrade the RLC DAR performance. The DAR would not able to maintain all the outstanding PDUs. In addition, it would introduce large sequence number (SN) jumps as a result of missing service data unit (SDU) to an upper layer of a signaling protocol stack (e.g., RRC 160 in FIG. 2). It would eventually degrade the quality of the MBMS service. Some of the problems introduced by the out-of-SYNC transport channels include the following. The error rate (e.g., RLC SDU error rate) seen by an upper layer of a signaling protocol stack (e.g., RRC 160 in FIG. 2) is increased. The DAR window cannot maintain all of the out of sequence PDUs. The PDUs from transport channels that are running behind will be discarded by the RLC DAR unit. A continuous and ordered PDU sequence cannot be formed and delivered to the upper layer. There is currently no RLC/RRC mechanism or any other mechanism that can be used to avoid and detect the out-of-SYNC transport channels or data links.

An out-of-SYNC avoidance and detection technique utilizing a window-based mechanism provides various advantages. Some of these are described herein according to various aspects of the disclosure: The selective combining performance is improved. The error rate seen by an upper layer of a signaling protocol stack is reduced. A greater number of out-of-sequence data packets can be maintained within a window of a processing unit of a UE (e.g., within the window of a DAR unit 549 in FIG. 5). The number of data packets being discarded by a processing unit (e.g., DAR unit 549) of a UE using the window-based mechanism is reduced. A continuous and ordered data packet stream can be provided to an upper layer of a signaling protocol stack. The technique can detect out-of-SYNC transport channels or data links. A long-term out-of-SYNC problem can be avoided. The technique can also increase the gain of the selection combining. The technique is simple to deploy. According to one aspect of the disclosure, a purely mobile software based implementation can be utilized for the technique, and network interactions and involvements are not necessary. This mobile-based solution is transparent to the network, and only one module is needed to add into the data link layer in the mobile software. A mobile-based solution is simpler and more feasible in a network deployment. In another aspect of the disclosure, the subject technology may be implemented using software, hardware, or a combination of both.

According to various aspects of the disclosure, a window-based technique can achieve two solutions: out-of-SYNC avoidance and out-of-SYNC detection. The out-of-SYNC avoidance may be a short term and microscopic methodology to guarantee that the data packets or data units passed into a window-based data processing unit (e.g., a DAR unit 547 in FIG. 5) are in SYNC. The out-of-SYNC detection may be a long-term strategy to recover from an out-of-SYNC problem.

Out-of-SYNC Avoidance:

According to one aspect, this out-of-SYNC avoidance technique filters out the data packets that are out of SYNC in the transmission time interval (TTI) such that the window of a data processing unit (e.g., a DAR unit) is not negatively affected by the out-of-SYNC transport channels.

This technique can guide the window-based data processing unit (e.g., a DAR unit) to follow the main group of the transport channels, which are in SYNC with the current window of the data processing unit. As a result, a more continuous and ordered packet sequence can be delivered to an upper layer of a signaling protocol stack. The error rate seen by the upper layer can also be reduced.

Out-of-SYNC Detection:

According to one aspect, this out-of-SYNC detection technique can call back a controller with an indication that a type-1 out-of-SYNC transport channel is detected after the certain transport channels have been out of SYNC for a period of time. It allows the controller to prioritize and select the transport channels that are more likely to be in SYNC with the other transport channels.

This technique can allow a communication system to avoid the long-term out-of-SYNC problem. This technique can increase the probability that the transport channels are in SYNC. The probability of the out-of-sequence data packets falling within the window of a data processing unit is thus increased, and the chances of discarding incoming data packets are reduced.

Those of skill in the art would appreciate that the various illustrative blocks, modules, elements, components, methods, and algorithms described herein may be implemented as electronic hardware, computer software, or combinations of both. For example, the communication system 600 of FIG. 6, the entity 530 of FIG. 5, the entity 540 of FIG. 5, and their components may be implemented as electronic hardware, computer software, or combinations of both. The entity 530 and its components may be implemented in a processing system 302 of a Node B 22 or an RNC 24. (See FIGS. 1, 3, and 5). The entity 540 and its components may be implemented in a processing system 302 of a UE 10. (See FIGS. 1, 3, and 5).

To illustrate interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The subject technology is not limited to any specific number of transport channels or any specific number of the DAR window size. The term "communication device" may refer to any communication system, a communication device, a processing system, a processing device, or a component thereof A phrase such as an "aspect" does not imply that such aspect is essential to the subject technology or that such aspect applies to all configurations of the subject technology. A disclosure relating to an aspect may apply to all configurations, or one or more configurations. A phrase such as an "embodiment" does not imply that such embodiment is essential to the subject technology or that such embodiment applies to all configurations of the subject technology. A disclosure relating to an embodiment may apply to all embodiments, or one or more embodiments.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A communication device comprising:
   a receiver configured to receive a plurality of data packets communicated via a plurality of transport channels, each received data packet corresponding to one of the plurality of transport channels, wherein the plurality of transport channels includes at least one out-of-synchronization transport channel;
   a ranking module configured to determine, based on a window-based parameter, a combination set of transport channels from the plurality of transport channels, the combination set of transport channels excluding the at least one out-of-synchronization transport channel; and
   an out-of-synchronization avoidance and detection unit configured to selectively filter the plurality of received data packets based on the transport channel corresponding to each of the received data packets, to:
      provide, to a data processing unit, a first set of received data packets, each corresponding to a transport channel in the combination set of transport channels; and
      prevent a second set of received data packets, each corresponding to one of the at least one out-of-synchronization transport channel, from being provided to the data processing unit.

2. The communication device of claim 1, further comprising a distance module configured to determine, based on a second window-based parameter, a plurality of combination sets of transport channels of the plurality of transport channels, wherein the ranking module is configured to determine the combination set of transport channels from the plurality of combination sets of transport channels.

3. The communication device of claim 2, wherein the window-based parameter includes one or more of the following:
   a distance value indicating a sequence number distance between a largest sequence number and a smallest sequence number associated with the first set of received data packets;
   a jump value indicating a sequence number jump amount from a next expected sequence number of a window of the data processing unit to the smallest sequence number associated with the first set of received data packets; and
   an overlap value indicating an overlapping sequence number range of sequence numbers of the first set of received data packets and sequence numbers corresponding to the window of the data processing unit, and
wherein the second window-based parameter includes one or more of the following:
   the distance value; and
   a predetermined maximum out-of-synchronization window size.

4. The communication device of claim 1, further comprising an out-of-synchronization timer manager configured to detect at least one out-of-synchronization transport channel.

5. The communication device of claim 1, further comprising an out-of-synchronization timer manager configured to stop an out-of-synchronization timer of each of the transport channels in the combination set of transport channels.

6. The communication device of claim 4, wherein a first transport channel of the at least one out-of-synchronization transport channel is out-of-synchronization relative to one or more other transport channels for a period less than a predetermined time period.

7. The communication device of claim 4, wherein a second transport channel of the at least one out-of-synchronization transport channel is out-of-synchronization relative to one or more other transport channels for a period less than a predetermined time period.

8. The communication device of claim 4, wherein the out-of-synchronization time manager includes a time manger, a timer expiration manger, or a combination thereof.

9. The communication device of claim 1, further comprising an out-of-synchronization timer manager configured to sort a plurality of out-of-synchronization transport channels in a descending order based on an overlap value.

10. The communication device of claim 1, wherein the combination set of transport channels has a distance value less than a pre-selected maximum out-of-synchronization window size.

11. The communication device of claim 1, wherein the combination set of transport channels has a jump value that is smallest amongst a plurality of combination sets of transport channels.

12. The communication device of claim 1, wherein the out-of-synchronization avoidance and detection unit provides the first set of received data packets to the data processing unit in an ascending order based on sequence numbers corresponding to the first set of received data packets.

13. The communication device of claim 1, wherein the communication device is a cellular telephone.

14. The communication device of claim 1, wherein the plurality of data packets is received via a radio interface.

15. The communication device of claim 1, wherein the plurality of transport channels is received from one or more base stations.

16. The communication device of claim 1, further comprising an out-of-synchronization timer manager configured to start an out-of-synchronization timer of each transport channel that is not in the combination set of transport channels.

17. The communication device of claim 1, further comprising an out-of-synchronization timer manager configured to detect that one or more out-of-synchronization timers have expired after a predetermined period of time.

18. The communication device of claim 1, further comprising an out-of-synchronization timer manager configured to provide a notification that the at least one out-of-synchronization transport channel is detected.

19. The communication device of claim 1, further comprising an out-of-synchronization timer manager comprising:
a timer manager configured to:
stop an out-of-synchronization timer of each of the transport channels in the combination set of transport channels; and
start an out-of-synchronization timer of each transport channel that is not in the combination set of transport channels; and
a timer expiration manager configured to:
detect that one or more out-of-synchronization timers have expired after a predetermined period of time; and
provide a notification that the at least one out-of-synchronization transport channel is detected.

20. A method comprising:
at a communication device, receiving a plurality of data packets communicated via a plurality of transport channels, each received data packet corresponding to one of the plurality of transport channels, wherein the plurality of transport channels includes at least one out-of-synchronization transport channel;
determining, based on a window-based parameter, a combination set of transport channels from the plurality of transport channels used by the communication device to receive the plurality of data packets, the combination set of transport channels excluding the at least one out-of-synchronization transport channel; and
selectively filtering the plurality of received data packets based on the transport channel corresponding to each of the received data packets, to:
provide, to a data processing unit within the communication device, a first set of received data packets, each corresponding to a transport channel in the combination set of transport channels; and
prevent a second set of received data packets, each corresponding to one of the at least one out-of-synchronization transport channel, from being provided to the data processing unit.

21. The method of claim 20, further comprising determining, based on a second window-based parameter, a plurality of combination sets of transport channels of the plurality of transport channels, wherein the combination set of transport channels is determined from the plurality of combination sets of transport channels.

22. The method of claim 21, wherein the window-based parameter includes one or more of the following:
a distance value indicating a sequence number distance between a largest sequence number and a smallest sequence number associated with the first set of received data packets;
a jump value indicating a sequence number jump amount from a next expected sequence number of a window of the data processing unit to the smallest sequence number associated with the first set of received data packets; and
an overlap value indicating an overlapping sequence number range of sequence numbers of the first set of received data packets and sequence numbers corresponding to the window of the data processing unit, and
wherein the second window-based parameter includes one or more of the following:
the distance value; and
a predetermined maximum out-of-synchronization window size.

23. The method of claim 20, further comprising detecting at least one out-of-synchronization transport channel of a first type.

24. The method of claim 23, wherein the detecting comprises:
stopping an out-of-synchronization timer of each of the transport channels in the combination set of transport channels;
starting an out-of-synchronization timer of each transport channel that is not in the combination set of transport channels;
detecting that one or more out-of-synchronization timers have expired after a predetermined period of time; and
providing a notification that the at least one out-of-synchronization transport channel of the first type is detected.

25. The method of claim 23, wherein, when the at least one out-of-synchronization transport channel of the first type comprises a plurality of out-of-synchronization transport channels of the first type, the method further comprises sorting the plurality of out-of-synchronization transport channels of the first type in a descending order based on an overlap value.

26. The method of claim 23, wherein at least one out-of-synchronization transport channel of a second type comprises one or more transport channels that are out-of-synchronization relative to one or more other transport channels for a period less than a predetermined time period, wherein the at least one out-of-synchronization transport channel of the first type comprises one or more transport channels that are out-of-synchronization relative to one or more other transport channels for a period longer than the predetermined time period.

27. The method of claim 20, wherein the combination set of transport channels has a distance value less than a pre-selected maximum out-of-synchronization window size.

28. The method of claim 27, wherein the distance value indicates a sequence number distance between a first sequence number and a second sequence number associated with the first set of received data packets.

29. The method of claim 20, wherein the combination set of transport channels has an overlap value that is largest amongst a plurality of combination sets of transport channels.

30. The method of claim 20, wherein the first set of received data packets are provided to the data processing unit in ascending order based on sequence numbers corresponding to the first set of received data packets.

31. A communication device comprising:
means for receiving a plurality of data packets communicated via a plurality of transport channels, each received data packet corresponding to one of the plurality of transport channels, wherein the plurality of transport channels includes at least one out-of-synchronization transport channel;
means for determining, based on a window-based parameter, a combination set of transport channels from the plurality of transport channels, the combination set of transport channels excluding the at least one out-of-synchronization transport channel;
means for selectively filtering the plurality of received data packets based on the transport channel corresponding to each of the received data packets, to:
provide, to a data processing unit, a first set of received data packets, each corresponding to a transport channel in the combination set of transport channels; and
prevent a second set of received data packets, each corresponding to one of the at least one out-of-synchronization transport channel, from being provided to the data processing unit.

32. The communication device of claim 31, further comprising means for determining, based on a second window-based parameter, a plurality of combination sets of transport channels of the plurality of transport channels, wherein the means for determining the combination set of transport channels determines the combination set of transport channels from the plurality of combination sets of transport channels.

33. The communication device of claim 32, wherein the window-based parameter includes one or more of the following:
a distance value indicating a sequence number distance between a largest sequence number and a smallest sequence number associated with the first set of received data packets;
a jump value indicating a sequence number jump amount from a next expected sequence number of a window of the data processing unit to the smallest sequence number associated with the first set of received data packets; and
an overlap value indicating an overlapping sequence number range of sequence numbers of the first set of received data packets and sequence numbers corresponding to the window of the data processing unit,
wherein the second window-based parameter includes one or more of the following:
the distance value; and
a predetermined maximum out-of-synchronization window size.

34. The communication device of claim 31, further comprising means for detecting at least one out-of-synchronization transport channel of a first type.

35. The communication device of claim 34, wherein the means for detecting the at least one out-of-synchronization transport channel of the first type comprises:
means for stopping an out-of-synchronization timer of each of the transport channels in the combination set of transport channels;
means for starting an out-of-synchronization timer of each transport channel that is not in the combination set of transport channels;
means for detecting that one or more out-of-synchronization timers have expired after a predetermined period of time; and
means for providing a notification that the at least one out-of-synchronization transport channel of the first type is detected.

36. The communication device of claim 34, wherein, when the at least one out-of-synchronization transport channel of the first type comprises a plurality of out-of-synchronization transport channels of the first type, the means for detecting the at least one out-of-synchronization transport channel of the first type is configured to sort the plurality of out-of-synchronization transport channels of the first type in a descending order based on an overlap value.

37. The communication device of claim 34, wherein at least one out-of-synchronization transport channel of a second type comprises one or more transport channels that are out-of-synchronization relative to one or more other transport channels for a period less than a predetermined time period, wherein the at least one out-of-synchronization transport channel of the first type comprises one or more transport channels that are out-of-synchronization relative to one or more other transport channels for a period longer than the predetermined time period.

38. The communication device of claim 31, wherein the combination set of transport channels has a distance value less than a pre-selected out-of-synchronization window size, the distance value indicating a sequence number distance between a largest sequence number and a smallest sequence number associated with the first set of received data packets.

39. The communication device of claim 31, wherein the combination set of transport channels has a jump value that is smallest amongst a plurality of combination sets of transport channels, and wherein the jump value indicates a sequence number jump amount from a next expected sequence number of a window of the data processing unit to a smallest sequence number of the combination set of transport channels.

40. The communication device of claim 31, wherein the first set of received data packets are provided to the data processing unit in ascending order based on sequence numbers corresponding to the first set of received data packets.

41. A non-transitory machine-readable medium comprising instructions executable by a processing system in a communication device, the instructions comprising code to perform a method comprising:
at a communication device, receiving a plurality of data packets communicated via a plurality of transport channels, each received data packet corresponding to one of the plurality of transport channels, wherein the plurality of transport channels includes at least one out-of-synchronization transport channel;
determining, based on a window-based parameter, a combination set of transport channels from the plurality of transport channels used by the communication device to receive the plurality of data packets, the combination set of transport channels excluding at least one out-of-synchronization transport channel; and
selectively filtering the plurality of received data packets based on the transport channel corresponding to each of the received data packets, to:
provide, to a data processing unit, a first set of received data packets, each corresponding to a transport channel in the combination set of transport channels; and
prevent a second set of received data packets, each corresponding to one of the at least one out-of-synchronization transport channel, from being provided to the data processing unit.

42. The non-transitory machine-readable medium of claim 41, wherein the method further comprises determining, based on a second window-based parameter, a plurality of combination sets of transport channels of the plurality of transport channels, wherein the combination set of transport channels is determined from the plurality of combination sets of transport channels.

43. The non-transitory machine-readable medium of claim 42, wherein the window-based parameter includes one or more of the following:
a distance value indicating a sequence number distance between a largest sequence number and a smallest sequence number associated with the first set of received data packets;
a jump value indicating a sequence number jump amount from a next expected sequence number of a window of the data processing unit to the smallest sequence number associated with the first set of received data packets of the combination set of transport channels; and
an overlap value indicating an overlapping sequence number range of sequence numbers of the first set of received data packets and sequence numbers corresponding to the window of the data processing unit;
wherein the second window-based parameter includes one or more of the following:
the distance value; and
a predetermined maximum out-of-synchronization window size.

44. The non-transitory machine-readable medium of claim 41, wherein the method further comprises detecting at least one out-of-synchronization transport channel of a first type.

45. The non-transitory machine-readable medium of claim 44, wherein the detecting comprises:
   stopping an out-of-synchronization timer of each of the transport channels in the combination set of transport channels;
   starting an out-of-synchronization timer of each transport channel that is not in the combination set of transport channels;
   detecting that one or more out-of-synchronization timers have expired after a predetermined period of time; and
   providing a notification that the at least one out-of-synchronization transport channel of the first type is detected.

46. The non-transitory machine-readable medium of claim 44, wherein, when the at least one out-of-synchronization transport channel of the first type comprises a plurality of out-of-synchronization transport channels of the first type, the method further comprises sorting the plurality of out-of-synchronization transport channels of the first type in a descending order based on an overlap value.

47. The non-transitory machine-readable medium of claim 44, wherein at least one out-of-synchronization transport channel of a second type comprises one or more transport channels that are out-of-synchronization relative to one or more other transport channels for a period less than a predetermined time period, wherein the at least one out-of-synchronization transport channel of the first type comprises one or more transport channels that are out-of-synchronization relative to one or more other transport channels for a period longer than the predetermined time period.

48. The non-transitory machine-readable medium of claim 41, wherein the combination set of transport channels has a distance value less than a pre-selected maximum out-of-synchronization window size, the distance value indicating a sequence number distance between a largest sequence number and a smallest sequence number associated with the first set of received data packets.

49. The non-transitory machine-readable medium of claim 41, wherein the combination set of transport channels has an overlap value that is largest amongst a plurality of combination sets of transport channels, and wherein the overlap value indicates an overlapping sequence number range of sequence numbers of the first set of received data packets and sequence numbers corresponding to the window of the data processing unit.

50. The non-transitory machine-readable medium of claim 41, wherein the first set of received data packets are provided to the data processing unit in ascending order based on sequence numbers corresponding to the first set of received data packets.

* * * * *